US011782704B1

(12) United States Patent
Tamilselvam et al.

(10) Patent No.: US 11,782,704 B1
(45) Date of Patent: Oct. 10, 2023

(54) APPLICATION REFACTORING WITH EXPLAINABILITY

(71) Applicant: International Business Machines Corporation, Armonk, NY (US)

(72) Inventors: Srikanth Govindaraj Tamilselvam, Chennai (IN); Alex Mathai, Mumbai (IN); Utkarsh Milind Desai, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/845,267

(22) Filed: Jun. 21, 2022

(51) Int. Cl.
*G06F 8/72* (2018.01)

(52) U.S. Cl.
CPC ..................... *G06F 8/72* (2013.01)

(58) Field of Classification Search
CPC ........................................................ G06F 8/72
See application file for complete search history.

(56) References Cited

U.S. PATENT DOCUMENTS

| | | | | |
|---|---|---|---|---|
| 10,721,791 | B1 * | 7/2020 | Gamliel | G06F 8/72 |
| 11,327,750 | B1 * | 5/2022 | Chawda | G06F 9/22 |
| 2008/0148225 | A1 | 6/2008 | Sarkar et al. | |
| 2020/0364127 | A1 | 11/2020 | White et al. | |
| 2020/0401386 | A1 * | 12/2020 | Punathil | G06F 8/433 |
| 2021/0234930 | A1 | 7/2021 | Dinh et al. | |

OTHER PUBLICATIONS

Al-Debagy et al., "A Microservice Decomposition Method Through Using Distributed Representation of Source Code" (Year: 2021).*
Kalia et al., "Mono2Micro: A Practical and Effective Tool for Decomposing Monolithic Java Applications to Microservices" (Year: 2021).*
Desai et al., "Graph Neural Network to Dilute Outliers for Refactoring Monolith Application" (Year: 2021).*
Brito et al. "Identification of Microservices from Monolithic Applications through Topic Modelling" (Year: 2021).*
Mazlami et al., "Identification of Microservices from Monolithic Applications through Topic Modelling" (Year: 2017).*

(Continued)

*Primary Examiner* — Phillip H Nguyen
(74) *Attorney, Agent, or Firm* — Garg Law Firm, PLLC; Rakesh Garg; Steven Bouknight

(57) ABSTRACT

By analyzing transaction data of an executing application, an application graph is constructed, the application graph comprising a plurality of nodes and a plurality of edges connecting pairs of the plurality of nodes, a node in the application graph corresponding to a module of the application. The plurality of nodes is clustered into a set of clusters. Formation of a cluster in the set of clusters is analyzed, the analyzing identifying a central node of the cluster, a feature importance in placing a node into the cluster, and an edge importance in placing the node into the cluster. Responsive to a confidence value in the cluster being above a threshold confidence value, using the central node of the cluster, the application is refactored into a set of microservices, the cluster corresponding to a microservice, the central node of the cluster corresponding to a component of the microservice.

20 Claims, 19 Drawing Sheets

(56) References Cited

OTHER PUBLICATIONS

Ip.com, Diluting Outliers for Refactoring Monolith Application through Attributed Graph Embeddings, Sep. 7, 2020.
Santos et al., Microservice decomposition and evaluation using dependency graph and silhouette coefficient, SBCARS '21: 15th Brazilian Symposium on Software Components, Architectures, and Reuse, Sep. 2021, pp. 51-60.
Cojocaru et al., MicroValid: A Validation Framework for Automatically Decomposed Microservices, Dec. 2019.
Desai et al., Graph Neural Network to Dilute Outliers for Refactoring Monolith Application, The Thirty-Fifth AAAI Conference on Artificial Intelligence (AAAI-21), Feb. 7, 2021.
Ip.com, System and Method for identifying critical business usecases from a monolith application being modernized with optimized business value, Aug. 16, 2020.
Agarwal et al., Monolith to Microservice Candidates using Business Functionality Inference, Sep. 5, 2021, ICWS 2021.

\* cited by examiner

US 11,782,704 B1

APPLICATION REFACTORING WITH EXPLAINABILITY

BACKGROUND

The present invention relates generally to a method, system, and computer program product for application refactoring. More particularly, the present invention relates to a method, system, and computer program product for application refactoring with explainability.

In computer programming and software design, application refactoring is the process of restructuring existing computer code without changing the code's behavior with respect to other applications. Application refactoring typically improves code readability and reduces complexity, thus improving the source code's maintainability and extensibility. Application refactoring also typically improves application performance by replacing code portions that are inefficient with more efficient versions of the same functionality, and reduces application size by removing code portions that are no longer needed.

A microservice architecture arranges an application as a collection of loosely-coupled microservices or simply services. Each service is typically a self-contained piece of business functionality with clear interfaces to other services. Implementing a new application or refactoring an existing application into a set of microservices typically provides modularity and scalability, as individual modules can be developed and deployed independently, making the application easier to understand, develop, test, and become more resilient to architecture erosion.

SUMMARY

The illustrative embodiments provide a method, system, and computer program product. An embodiment includes a method that constructs, by analyzing transaction data of an executing application, an application graph, the application graph comprising a plurality of nodes and a plurality of edges connecting pairs of the plurality of nodes, a node in the application graph corresponding to a module of the application. An embodiment clusters, into a set of clusters, the plurality of nodes. An embodiment analyzes formation of a cluster in the set of clusters, the analyzing identifying a central node of the cluster, a feature importance in placing a node into the cluster, and an edge importance in placing the node into the cluster. An embodiment refactors, responsive to a confidence value in the cluster being above a threshold confidence value, using the central node of the cluster, the application into a set of microservices, the cluster corresponding to a microservice in the set of microservices, the central node of the cluster corresponding to a component of the microservice.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
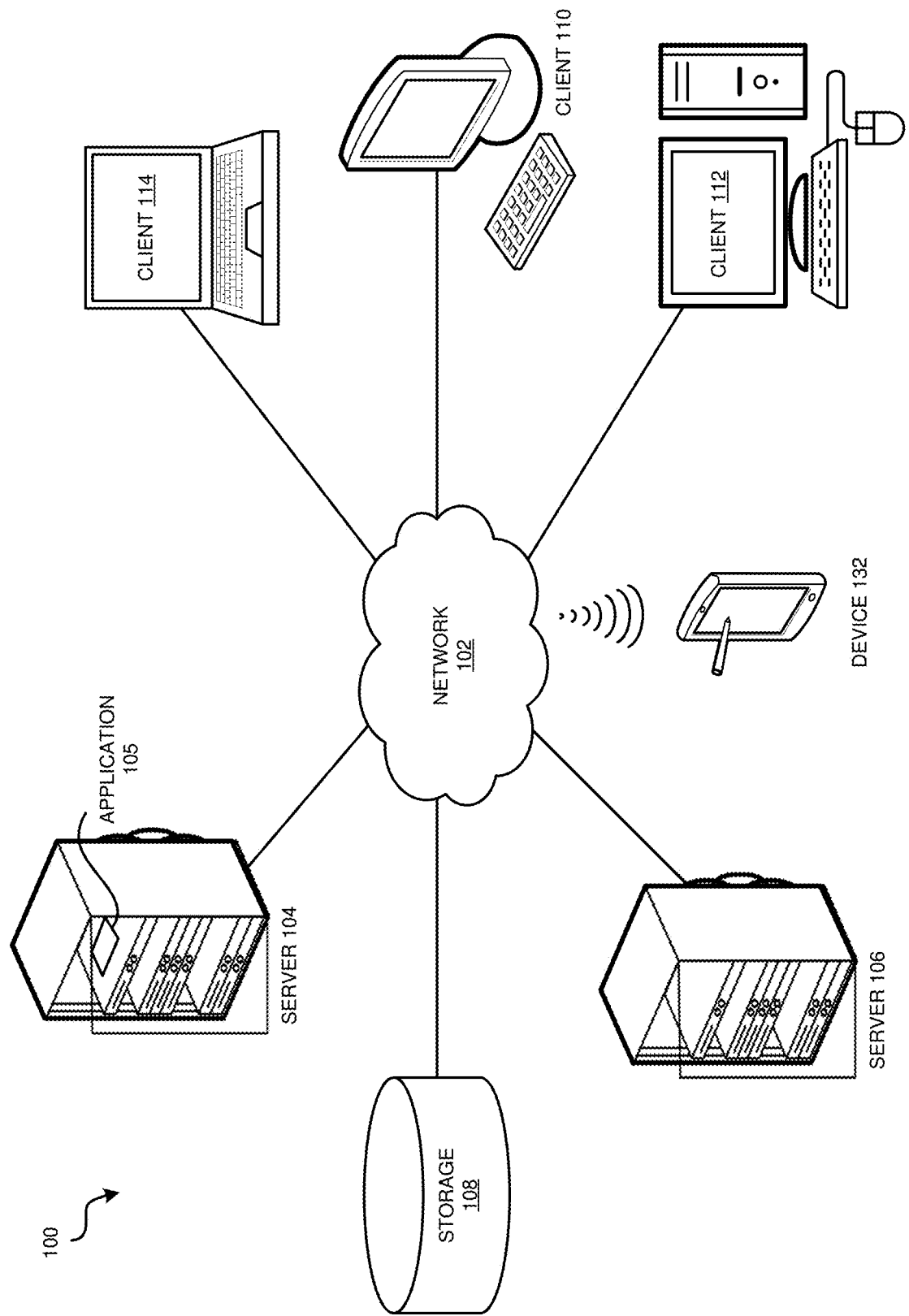
FIG. 1 depicts a block diagram of a network of data processing systems in which illustrative embodiments may be implemented.

The illustrative embodiments recognize that, when refactoring an existing application into a microservice architecture, the size of the services as well as which functions to implement within which services are important design decisions. If there are too many services, there will be unnecessary inter-service communications (called transactions), resulting in inefficiencies as transactions between services take more time than communications among components of a single service. However, if there are too few services, each service might become insufficiently modular and thus harder to maintain than a more modular application. In addition, to minimize transactions between services, code functions that communicate often with each other should be placed in the same service. However, to improve code reusability it might be more efficient to place code modules that implement a discrete function—for example, user account management—in their own service, even though this might result in additional transactions with other services. Nor, typically, can each code module be placed into a separate service, because a legacy application might have five thousand or more code modules—too many for efficient operation as microservices and too many for a typical development team to support and maintain. Evaluating these design tradeoffs is made more difficult when a software architect is faced with a large, legacy application implemented over years or even decades, often in a computer language (e.g., COBOL) the architect might not be familiar with. Thus, application refactoring is often expensive, time-consuming, largely manual, and often error-prone.

The illustrative embodiments recognize that automated techniques to decompose an application into microservices are presently available. For example, one tool, Mono2Micro, distributes code modules among services to minimize data dependencies and based on business-logic-based recommendations. However, Mono2Micro uses test cases and use cases (groups of related test cases) from developers to explain microservice sizes, but such test cases are often unavailable or out of date. In addition, presently available techniques do not provide an explanation of why an application was recommended for division in a particular way. Even if the techniques provide a set of metrics, such metrics measure attributes of a graph, and are not related to the factors an application developer requires, such as services, programs and other code modules within the services, call relationships among code modules, inheritance in object-oriented code, data structures, and the like. As a result, a human subject matter expert is not able to validate an automated tool's output, resulting in reluctance to use such a tool or trust the output. Thus, the illustrative embodiments recognize that, for an automated refactoring technique to be successful, there is a need for the technique to explain why a particular number of microservices was chosen, how and why code functions were grouped into a particular microservice, a confidence value in the selected microservices and their components, and which code modules in a cluster were not core to the microservice functionality. Once the automated refactoring technique has determined a microservices architecture for the application being refactored, there is also a need to implement the refactoring in an automated manner, to save developer time and reduce errors.

The illustrative embodiments recognize that the presently available tools or solutions do not address these needs or provide adequate solutions for these needs. The illustrative embodiments used to describe the invention generally address and solve the above-described problems and other problems related to application refactoring with explainability.

An embodiment can be implemented as a software application. The application implementing an embodiment can be configured as a modification of an existing application refactoring system, as a separate application that operates in conjunction with an existing application refactoring system, a standalone application, or some combination thereof.

Particularly, some illustrative embodiments provide a method that constructs, by analyzing transaction data of an executing application, an application graph, clusters the nodes of the application graph into a set of clusters, analyzes formation of a cluster in the set of clusters to identify a central node of the cluster, a feature importance in placing a node into the cluster, and an edge importance in placing the node into the cluster, and uses the central node, the feature importance, and the edge importance to refactor the application into a set of microservices.

An embodiment receives application data and application transaction data of an executing application which is to be refactored. Application data is data of the application itself. In one embodiment, the application data includes source code of the application. One non-limiting example of application data is which classes, methods, functions, subroutines, or other portions of code invoke which other portions of code, as well as the parameters or other data passed when calling and returning from portions of code. Another non-limiting example of application data is the result of an inheritance analysis between classes within an application implemented using classes. Another non-limiting example of application data is the results of a similarity analysis between classes, methods, or other portions of source code with each other, by considering the semantic information embedded in comments and identifiers in the source code. Another non-limiting example of application data is the results of a similarity analysis between names of identifiers in the source code. Another non-limiting example of application data is the results of analyzing data paths through an application. Application transaction data is data of the application's transactions—in other words, data the application moves between application modules, or into and out of an application (for example, data received from a user or data being stored in a file). Techniques are presently available to analyze application source code, if available, and an executing application to produce application data and application transaction data.

An embodiment analyzes the application data and application transaction data, and using the analysis results represents a code module (e.g., a function or method) or source or sink of data of the application being refactored with a corresponding feature vector. A feature vector is a multidimensional number encoding a set of features or attributes of a code module. An embodiment also uses the analysis results and the feature vectors to construct a graph representing the application being refactored, in which a node of the graph represents a code module (e.g., a function or method) or source or sink of data, and an edge of the graph connecting two nodes represents a data access path between modules represented by the nodes. Techniques for constructing feature vectors are presently known. One presently-known technique for constructing a graph representing an application uses a graphing model; other techniques for constructing a graph representing an application are also presently known.

An embodiment clusters nodes of the application graph into a set of clusters. Each cluster will represent one microservice when the application is refactored.

To perform the clustering, an embodiment selects a plurality of nodes in the application graph that each correspond to a resource of the application being refactored. A resource is a data source of a transaction recorded in the application transaction data. Each selected node is termed a cluster seed, which will be the basis for forming a cluster. One embodiment receives data designating particular nodes as cluster seeds from a human subject matter expert. Another embodiment uses every identified resource as a cluster seed. Another embodiment uses a subset of the identified resources as cluster seeds. Other methods of cluster seed selection are also possible and contemplated within the scope of the illustrative embodiments.

An embodiment merges a cluster seed that is not independent with an independent cluster seed. An independent cluster seed corresponds to a resource of the application that performs at least one transaction without utilizing another resource. Thus, a cluster seed that is not independent corresponds to a resource of the application that performs all of its transactions utilizing at least one other resource. One embodiment selects which independent cluster seed to merge with the cluster seed that is not independent using a set of rules or heuristics. Another embodiment merges the cluster seed that is not independent with a subset of, or with each of the independent cluster seeds, performs clustering with each of the possible configurations, and evaluates each of the results against a metric to select the best clustering result.

For example, consider an application in which the keygenejb resource is not independent, because it does not perform at least one transaction without utilizing another resource. Instead, keygenejb always occurs in transactions with resources called accountejb, accountprofileejb, holdingejb, orderejb, and quoteejb. Keygenejb interacts more often with accountejb and accountprofileejb than with the other resources, so should be merged with one of accountejb and accountprofileejb. Both accountejb and accountprofileejb have the same number of exclusive modules (not shared with other resources) so either is an acceptable merger candidate. Thus, one embodiment merges keygenejb with accountejb, another embodiment merges keygenejb with accountprofileejb, and a third embodiment merges keygenejb with each of accountejb and accountprofileejb and evaluates each of the results against a metric.

An embodiment merges cluster seeds corresponding to a pair of resources of the application that perform more than a predetermined threshold number of the transactions recorded in the transaction data with each other. Continuing the example, in the example application accountejb and accountprofileejb perform transactions with each other 27 times within a monitoring period, above a predetermined threshold of 20. Thus, an embodiment merges accountejb and accountprofileejb into one cluster seed.

An embodiment forms a cluster seed and a subset of the nodes in the application graph into a cluster. Each node in the subset corresponds to an application module (such as a function or method) called only by the resource corresponding to the cluster seed. To form clusters, one embodiment takes cluster seeds as starting points for forming clusters and uses a clustering model that takes, as inputs, feature vectors corresponding to nodes in the application graph, optionally reduces the number of dimensions in each feature vector, and forms clusters by computing distances between nodes, using the feature vectors as points in a feature space. Thus, a cluster center is the average of the feature vectors corresponding to each node. In one embodiment, the clustering model is implemented using a graph neural network (GNN) model to learn feature vectors corresponding to each node, and k means clustering to form clusters. A GNN is a class of neural network for processing data represented by a graph. Different variants of GNNs are presently known. K means clustering is a presently available technique of data analysis that aims to iteratively partition n observations into k clusters. Other clustering techniques are also possible and contemplated within the scope of the illustrative embodiments.

Continuing the example, in the example application accountejb, accountprofileejb, and keygenejb have been merged into one cluster seed. Other nodes in the application graph correspond to modules KeySequenceDirect and PingServlet2Session2CMROne2One, which are called only by one of accountejb, accountprofileejb, and keygenejb. Thus, an embodiment forms all of the nodes representing accountejb, accountprofileejb, keygenejb, KeySequenceDirect, and PingServlet2Session2CMROne2One into one cluster.

An embodiment uses the clustering model to add, to a cluster, a node corresponding to an application module called more than a predetermined threshold proportion of times by the resource corresponding to the cluster seed. Continuing the example, in the example application the modules TradeAppServlet and KeySequenceDirect interact with one of accountejb, accountprofileejb, and keygenejb more than a predetermined threshold proportion—here, more than three quarters—of all of their interactions. Thus, an embodiment adds nodes representing TradeAppServlet and KeySequenceDirect to the cluster with accountejb, accountprofileejb, keygenejb, KeySequenceDirect, and PingServlet2Session2CMROne2One. An embodiment also uses the clustering model to assign other nodes corresponding to application modules to clusters.

An embodiment identifies a central node of the cluster. One embodiment selects, as the central node in the cluster, a node closest to an arithmetic mean of all nodes in the cluster. The embodiment determines the arithmetic mean of all nodes in the cluster by treating the feature vectors corresponding to each node in the cluster as sets of coordinates, or points, in a multidimensional space, and averaging the feature vectors together. The embodiment determines the node closest to the arithmetic mean by computing a distance, in terms of feature vectors, between the arithmetic mean and each node in the cluster.

An embodiment calculates, by averaging soft clustering co-efficient values of all nodes in the cluster, a confidence value in the cluster. A soft clustering co-efficient value of a node is a confidence value corresponding to the clustering model's placement of a node within a particular cluster. For example, if a node's soft clustering co-efficient value is equal to 0.9 (on a 0-1 scale), the model was very confident in its placement of this node within a particular cluster. As another example, if a second node's soft clustering co-efficient value is equal to 0.6 (on the same 0-1 scale), the model was less confident in its placement of the second node within its particular cluster. To compute a soft clustering co-efficient value of a node, an embodiment uses a distance of a particular node from the central nodes of multiple clusters. In one embodiment, if the distance of a node from a first central node is denoted by $d_1$ and the distance of a node from a second central node is denoted by $d_2$, the node's soft clustering co-efficient value=$(1/d_1^2)/(1/d_1^2+1/d_2^2)$.

An embodiment identifies a feature importance and an edge importance in placing a node into a cluster. In particular, an embodiment sets a feature vector corresponding to a target node to zero and reclusters the nodes of the application graph, using the clustering model. The size of a difference in placing the target node into a cluster (between the original clustering and the reclustering with a zero-ed out feature vector) determines how much of the original clustering came from the features of the target node. If the difference is more than a predetermined threshold amount, the features of the target node (as expressed by the node's feature vector) played a more significant role in the clustering than the edges connected to the node. An embodiment also eliminates the edges connected to the target node, in the application graph, and reclusters the nodes of the application graph. The size of a difference in placing the target node into a cluster (between the original clustering and the reclustering with edges removed) determines how much of the original clustering came from the edges connected to the target node.

An embodiment also determines a set of most important features, and a set of most important edges. To determine a set of most important features and a set of most important edges, an embodiment trains an explainer model to learn values corresponding to nodes and features. In particular, an embodiment alters weights of nodes, re-runs the clustering model to generate a new set of clusters, and determines how much the altered weights have altered placement of nodes into clusters. One embodiment uses values in a 0-1 range, in which an edge's value being zero means that the edge does not exist in the application graph, and an edge's value being one means that the edge does exist in the application graph. Thus, an edge that changes the placement of a particular node into a cluster by a relatively large amount has a value close to one, and is thus an important edge, while an edge that changes the placement of a particular node into a cluster by a relatively small amount has a value close to zero, and is thus not an important edge in influencing placement of that node into a cluster. Similarly, a feature that changes the placement of a particular node into a cluster by a relatively large amount has a value close to one, and is thus an important feature, while a feature that changes the placement of a particular node into a cluster by a relatively small amount has a value close to zero, and is thus not an important feature in influencing placement of that node into a cluster. One embodiment produces a probability distribution for a node, comprising a set of probabilities that a node is placed within different clusters. For example, a probability distribution for a node of (0.8, 0.06, 0.05) denotes that the node has a probability of 0.8 of being placed into cluster 1, a probability of 0.06 of being placed into cluster, and a probability of 0.05 of being placed into cluster 3 (all on a 0-1 scale).

An embodiment provides the set of clusters, and a confidence value, central node, feature importance, and edge importance of one or more clusters to a subject matter expert as guidance in designing a refactoring of the application. Each cluster denotes a microservice, and nodes in a cluster denote which application modules should be included in that particular microservice. The confidence value, the central node of the cluster, the feature importance, and the edge importance provide an explanation to the subject matter expert as to why a particular number of microservices was chosen, how and why code functions were grouped into a particular microservice, a confidence value in the selected microservices and their components, and which code modules in a cluster were not core to the microservice functionality. One embodiment provides the subject matter expert with an option to reassign a node (representing a code module) to a different cluster.

If a confidence value in a cluster is above a threshold confidence value, or if the subject matter expert approves, an embodiment uses the nodes in the cluster (including the central node) to automatically refactor the application into a set of microservices. The cluster corresponds to a microservice, the central node of the cluster corresponds to a component of the microservice, and other nodes of the cluster correspond to other code components implemented in the microservice. Techniques for automatic application refactoring into a set of microservices (e.g. Mono2Micro) are presently available.

The manner of application refactoring with explainability described herein is unavailable in the presently available methods in the technological field of endeavor pertaining to automated software application development and refactoring. A method of an embodiment described herein, when implemented to execute on a device or data processing system, comprises substantial advancement of the functionality of that device or data processing system in constructing by analyzing transaction data of an executing application, an application graph, clustering the nodes of the application graph into a set of clusters, analyzing formation of a cluster in the set of clusters to identify a central node of the cluster, a feature importance in placing a node into the cluster, and an edge importance in placing the node into the cluster, and using the central node, the feature importance, and the edge importance to refactor the application into a set of microservices.

The illustrative embodiments are described with respect to certain types of applications, microservices, services, source code components, clusters, clusterings, nodes, edges, application graphs, feature vectors, thresholds, confidence values, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
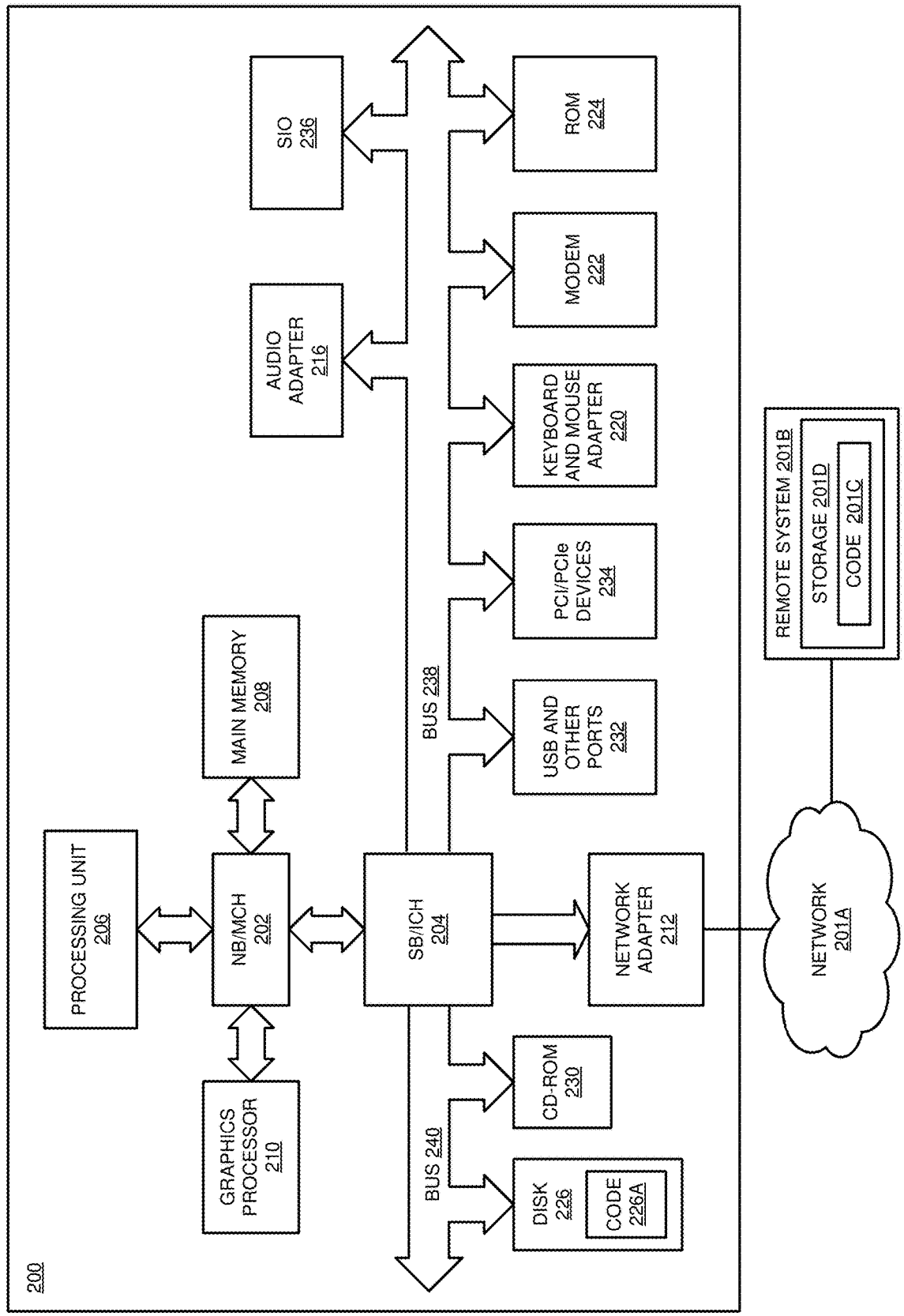
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. An application being analyzed and refactored, also executes in any of servers 104 and 106, clients 110, 112, and 114, and device 132, and need not execute on the same system as application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
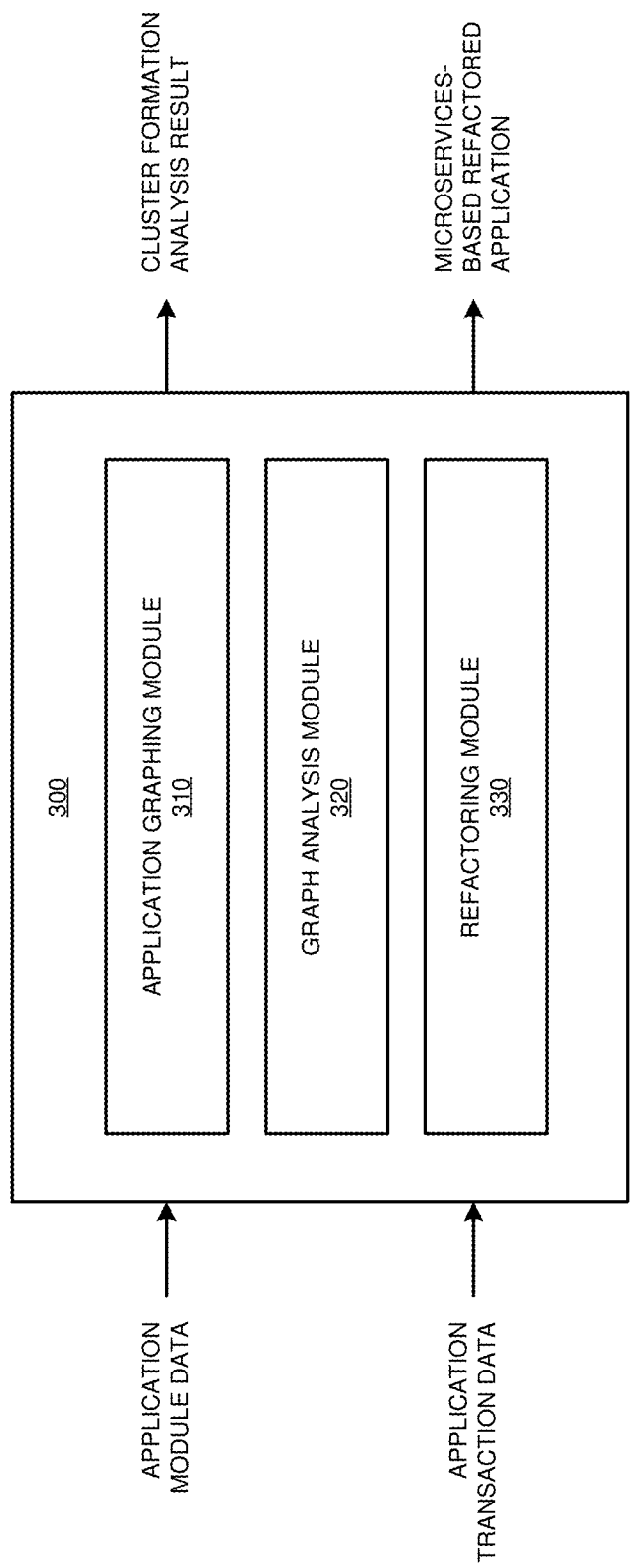
FIG. 3 depicts a block diagram of an example configuration for application refactoring with explainability in accordance with an illustrative embodiment.

With reference to FIG. 3, this figure depicts a block diagram of an example configuration for application refactoring with explainability in accordance with an illustrative embodiment. Application 300 is an example of application 105 in FIG. 1 and executes in any of servers 104 and 106, clients 110, 112, and 114, and device 132 in FIG. 1.

Application graphing module 310 receives application data and application transaction data of an executing application which is to be refactored. In one implementation of module 310, the application data includes source code of the application. One non-limiting example of application data is which classes, methods, functions, subroutines, or other portions of code invoke which other portions of code, as well as the parameters or other data passed when calling and returning from portions of code. Another non-limiting example of application data is the result of an inheritance analysis between classes within an application implemented using classes. Another non-limiting example of application data is the results of a similarity analysis between classes, methods, or other portions of source code with each other, by considering the semantic information embedded in comments and identifiers in the source code. Another non-limiting example of application data is the results of a similarity analysis between names of identifiers in the source code. Another non-limiting example of application data is the results of analyzing data paths through an application. Application transaction data is data of the application's transactions—in other words, data the application moves between application modules, or into and out of an application (for example, data received from a user or data being stored in a file).

Module 310 analyzes the application data and application transaction data, and using the analysis results represents a code module (e.g., a function or method) or source or sink of data of the application being refactored with a corresponding feature vector. Module 310 also uses the analysis results and the feature vectors to construct a graph representing the application being refactored, in which a node of the graph represents a code module (e.g., a function or method) or source or sink of data, and an edge of the graph connecting two nodes represents a data access path between modules represented by the nodes.

Graph analysis module 320 clusters nodes of the application graph into a set of clusters. Each cluster will represent one microservice when the application is refactored. Module 320 also determines a confidence value, central node, feature importance, and edge importance of one or more clusters in the set of clusters. Module 320 provides the set of clusters, and a confidence value, central node, feature importance, and edge importance of one or more clusters to a subject matter expert as guidance in designing a refactoring of the application. Each cluster denotes a microservice, and nodes in a cluster denote which application modules should be included in that particular microservice. The confidence value, the central node of the cluster, the feature importance, and the edge importance provide an explanation to the subject matter expert as to why a particular number of microservices was chosen, how and why code functions were grouped into a particular microservice, a confidence value in the selected microservices and their components, and which code modules in a cluster were not core to the microservice functionality.

If a confidence value in a cluster is above a threshold confidence value, refactoring module 330 uses the nodes in the cluster (including the central node) to automatically refactor the application into a set of microservices. The cluster corresponds to a microservice, the central node of the cluster corresponds to a component of the microservice, and other nodes of the cluster correspond to other code components implemented in the microservice.

Figure 4:
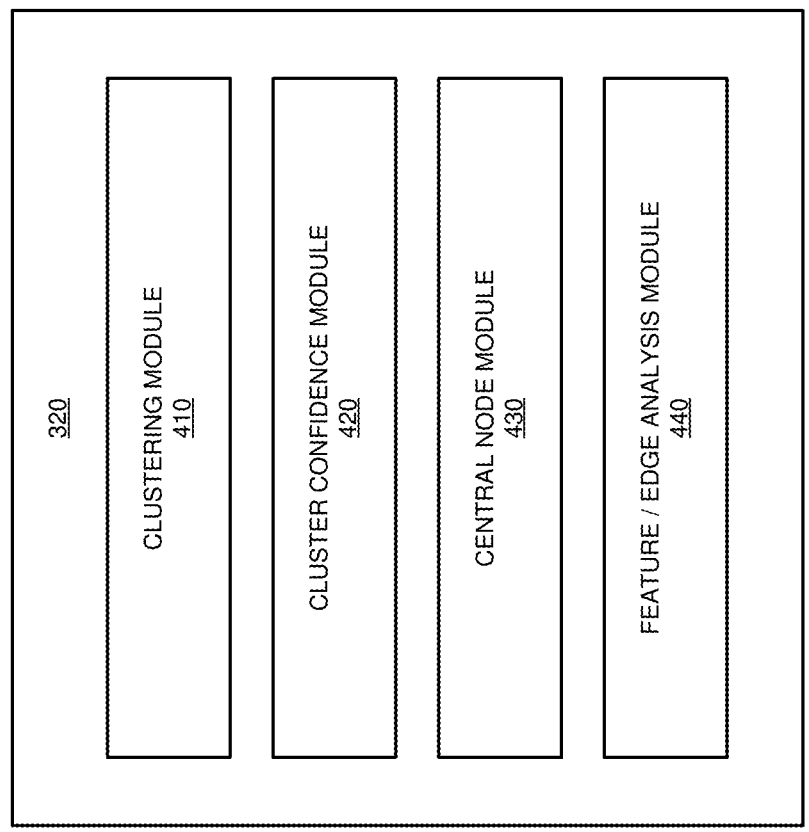
FIG. 4 depicts a block diagram of an example configuration for application refactoring with explainability in accordance with an illustrative embodiment.

With reference to FIG. 4, this figure depicts a block diagram of an example configuration for application refactoring with explainability in accordance with an illustrative embodiment. In particular, FIG. 4 depicts more detail of graph analysis module 320 in FIG. 3.

Clustering module 410 clusters nodes of the application graph into a set of clusters. More detail of clustering module 410 is provided with respect to FIG. 5 herein.

Cluster confidence module 420 calculates, by averaging soft clustering co-efficient values of all nodes in the cluster, a confidence value in the cluster. To compute a soft clustering co-efficient value of a node, one implementation of module 420 uses a distance of a particular node from the central nodes of multiple clusters. In one implementation of module 420, if the distance of a node from a first central node is denoted by $d_1$ and the distance of a node from a second central node is denoted by $d_2$, the node's soft clustering co-efficient value=$(1/d_1^2)/(1/d_1^2+1/d_2^2)$.

Central node module 430 identifies a central node of the cluster. One implementation of module 430 selects, as the central node in the cluster, a node closest to an arithmetic mean of all nodes in the cluster. The implementation determines the arithmetic mean of all nodes in the cluster by treating the feature vectors corresponding to each node in the cluster as sets of coordinates, or points, in a multidimensional space, and averaging the feature vectors together. The implementation determines the node closest to the arithmetic mean by computing a distance, in terms of feature vectors, between the arithmetic mean and each node in the cluster.

Feature/edge analysis module 440 identifies a feature importance and an edge importance in placing a node into a cluster. In particular, module 440 sets a feature vector corresponding to a target node to zero and reclusters the nodes of the application graph. The size of a difference in placing the target node into a cluster (between the original clustering and the reclustering with a zero-ed out feature vector) determines how much of the original clustering came from the features of the target node. If the difference is more than a predetermined threshold amount, the features of the target node (as expressed by the node's feature vector) played a more significant role in the clustering than the edges connected to the node. Module 440 also eliminates the edges connected to the target node, in the application graph, and reclusters the nodes of the application graph. The size of a difference in placing the target node into a cluster (between the original clustering and the reclustering with edges removed) determines how much of the original clustering came from the edges connected to the target node.

Module 440 also uses the two sets of differences to determine a set of most important features, and a set of most important edges. In particular, module 440 trains an explainer model to learn values corresponding to nodes and features. In particular, an embodiment alters weights of nodes, re-runs the clustering model to generate a new set of clusters, and determines how much the altered weights have altered placement of nodes into clusters.

Figure 5:
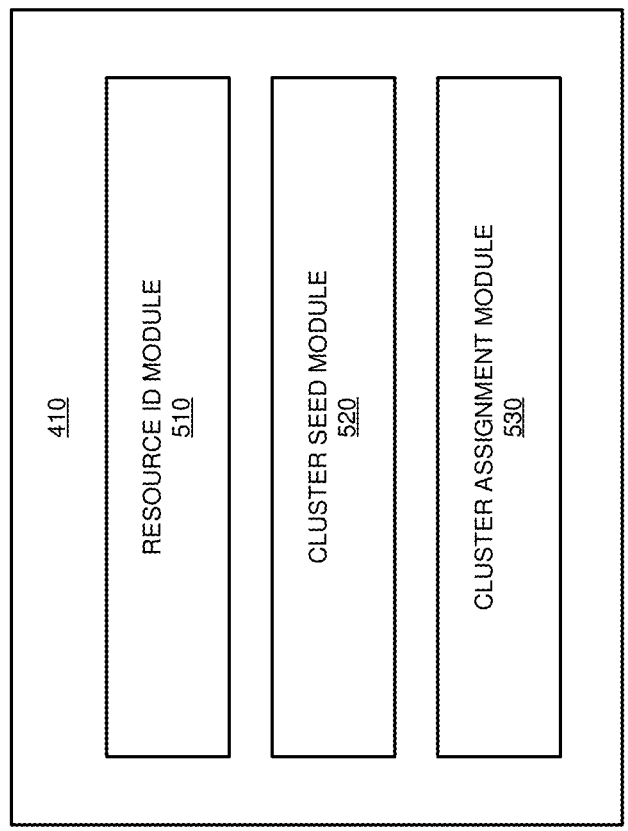
FIG. 5 depicts a block diagram of an example configuration for application refactoring with explainability in accordance with an illustrative embodiment.

With reference to FIG. 5, this figure depicts a block diagram of an example configuration for application refactoring with explainability in accordance with an illustrative embodiment. In particular, FIG. 5 depicts more detail of clustering module 410 in FIG. 4.

Resource identification module 510 identifies a plurality of nodes in the application graph that each correspond to a resource of the application being refactored.

Cluster seed module 520 uses some or all of the identified resources as cluster seeds, each of which will be the basis for forming a cluster. One implementation of module 520 receives data designating particular nodes as cluster seeds from a human subject matter expert. Another implementation of module 520 uses every identified resource as a cluster seed. Another implementation of module 520 uses a subset of the identified resources as cluster seeds.

Module 520 merges a cluster seed that is not independent with an independent cluster seed. An independent cluster seed corresponds to a resource of the application that performs at least one transaction without utilizing another resource. Thus, a cluster seed that is not independent corresponds to a resource of the application that performs all of its transactions utilizing at least one other resource. One implementation of module 520 selects which independent cluster seed to merge with the cluster seed that is not independent using a set of rules or heuristics. Another implementation of module 520 merges the cluster seed that is not independent with a subset of, or with each of the independent cluster seeds, performs clustering with each of the possible configurations, and evaluates each of the results against a metric to select the best clustering result. Module 520 also merges cluster seeds corresponding to a pair of resources of the application that perform more than a predetermined threshold number of the transactions recorded in the transaction data with each other.

Cluster assignment module 530 forms a cluster seed and a subset of the nodes in the application graph into a cluster. Each node in the subset corresponds to an application module (such as a function or method) called only by the resource corresponding to the cluster seed. To form clusters, one implementation of module 530 takes cluster seeds as starting points for forming clusters and uses a clustering model that takes, as inputs, feature vectors corresponding to nodes in the application graph, optionally reduces the number of dimensions in each feature vector, and forms clusters by computing distances between nodes, using the feature vectors as points in a feature space. Thus, a cluster center is the average of the feature vectors corresponding to each node. In one implementation of module 530, the clustering model is implemented using a GNN model to learn feature vectors corresponding to each node, and k means clustering to form clusters.

Module 530 adds, to a cluster, a node corresponding to an application module called more than a predetermined threshold proportion of times by the resource corresponding to the cluster seed. Module 530 also uses the clustering model to assign other nodes corresponding to application modules to clusters.

Figure 6:
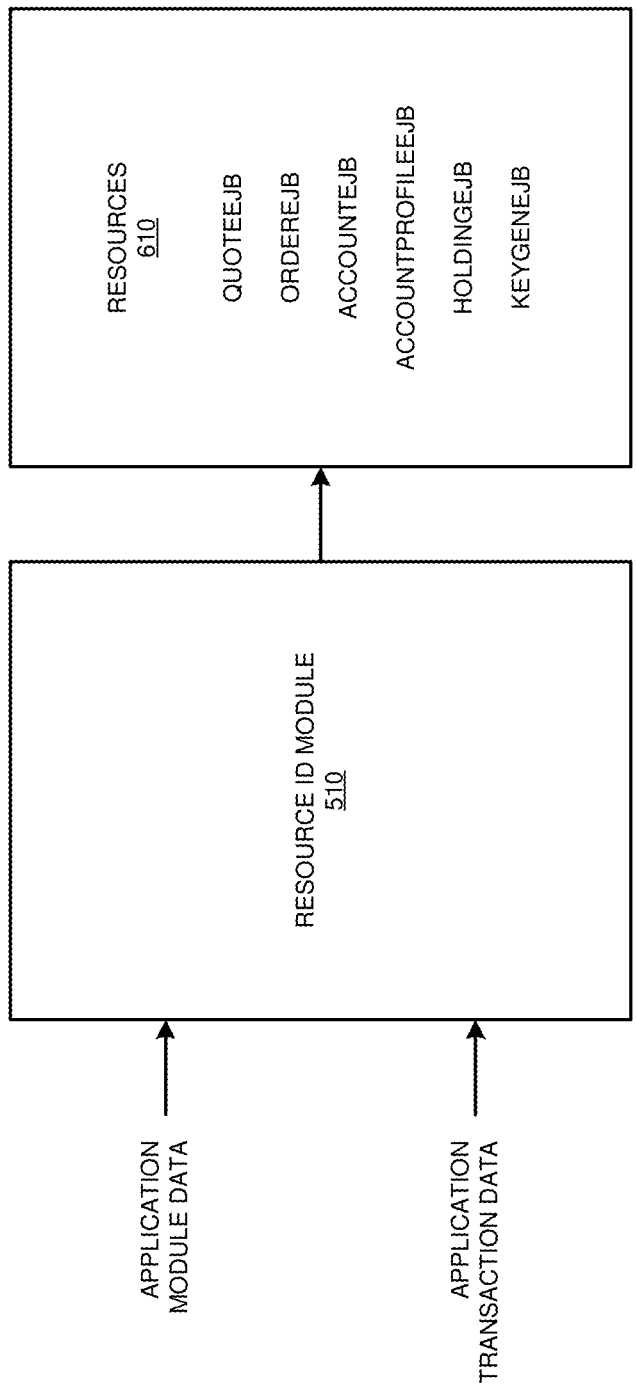
FIG. 6 depicts an example of application refactoring with explainability in accordance with an illustrative embodiment.

With reference to FIG. 6, this figure depicts an example of application refactoring with explainability in accordance with an illustrative embodiment. The example can be executed using application 300 in FIG. 3. Resource identification module 510 is the same as resource identification module 510 in FIG. 5.

As depicted, resource identification module 510 analyzes the application data and application transaction data, and using the analysis results selects a plurality of nodes in the application graph that each correspond to a resource of the application being refactored. The result is resources 610.

Figure 7:
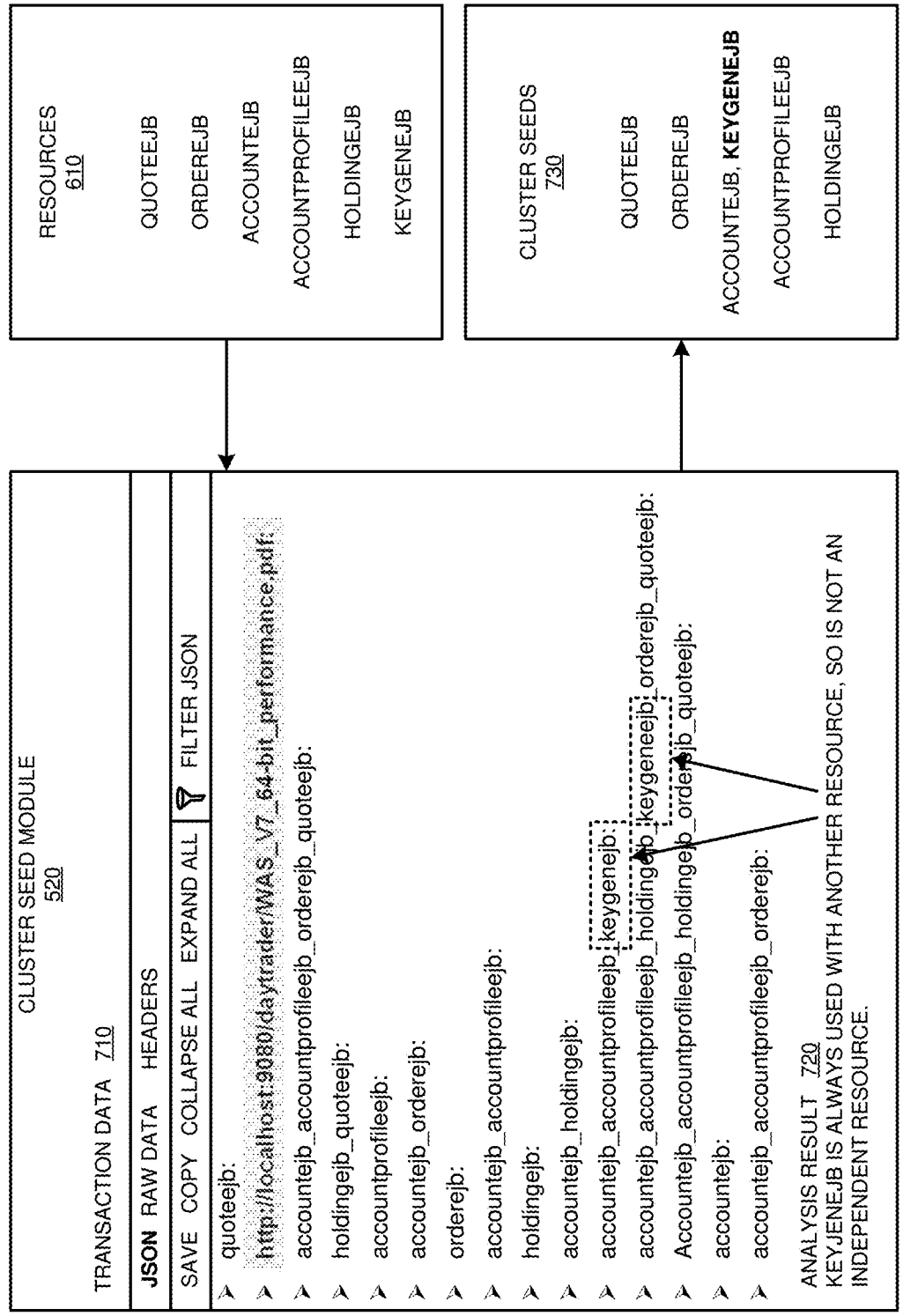
FIG. 7 depicts a continued example of application refactoring with explainability in accordance with an illustrative embodiment.

With reference to FIG. 7, this figure depicts a continued example of application refactoring with explainability in accordance with an illustrative embodiment. Cluster seed module 520 is the same as cluster seed module 520 in FIG. 5. Resources 610 is the same as resources 610 in FIG. 6.

As depicted, cluster seed module 520 uses transaction data 710 to determine analysis result 720: keyjenejb is always used with another resource, so is not an independent resource. Keygenejb interacts more often with accountejb and accountprofileejb than with the other resources, so should be merged with one of accountejb and accountprofileejb. Both accountejb and accountprofileejb have the same number of exclusive modules (not shared with other resources) so either is an acceptable merger candidate. Thus, module 520 merges keygenejb with accountejb, producing cluster seeds 730. Note that keygenejb is depicted in bold font, denoting the merge.

Figure 8:
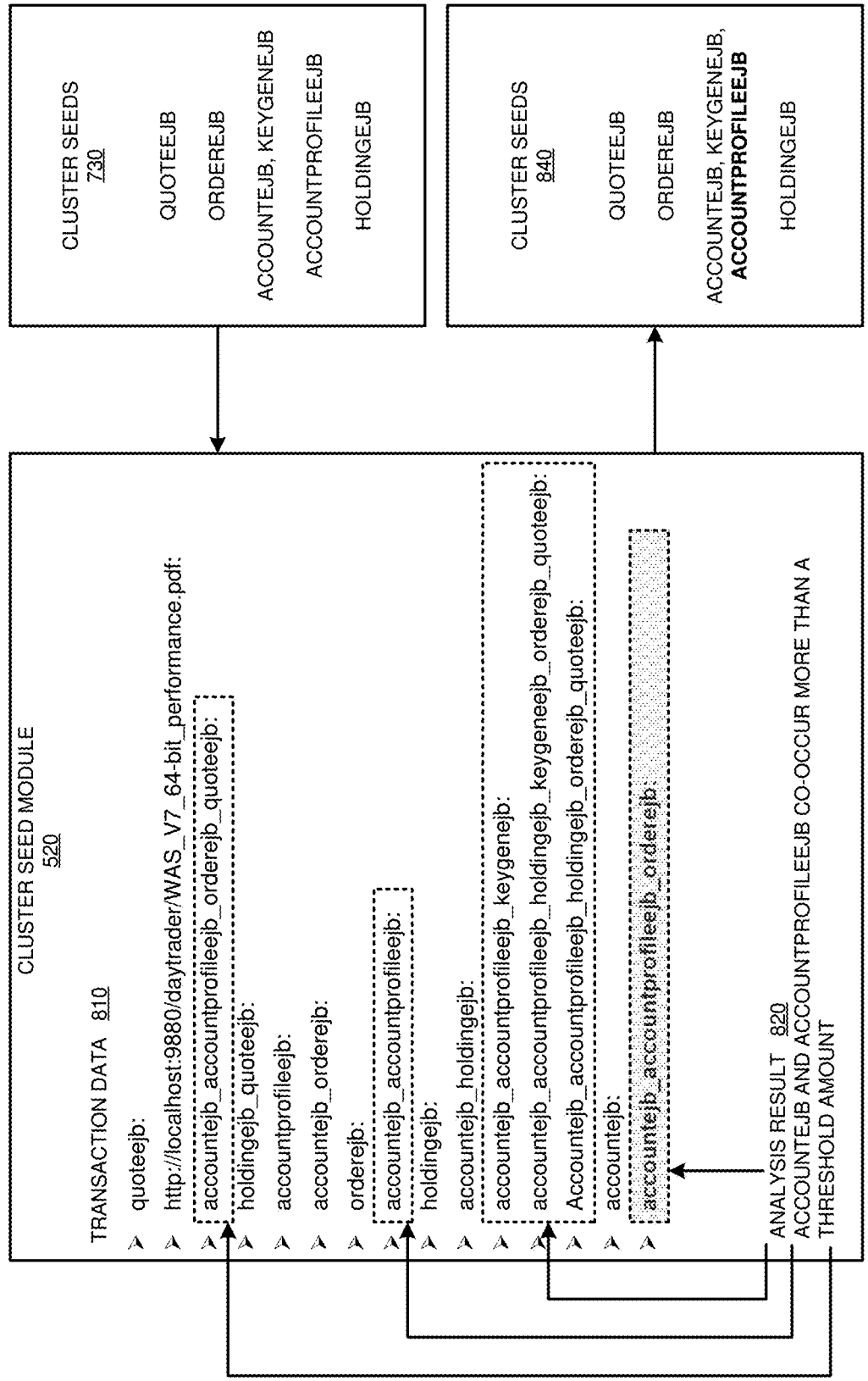
FIG. 8 depicts a continued example of application refactoring with explainability in accordance with an illustrative embodiment.

With reference to FIG. 8, this figure depicts a continued example of application refactoring with explainability in accordance with an illustrative embodiment. Cluster seeds module 520 is the same as cluster seed module 520 in FIG. 5. Cluster seeds 730 is the same as cluster seeds 730 in FIG. 7.

As depicted, cluster seed module 520 uses transaction data 810 to determine analysis result 820: accountejb and accountprofileejb co-occur more than a threshold amount. Thus, module 520 merges accountprofileejb with accountejb and keygenejb, producing cluster seeds 840. Note that accountprofileejb is depicted in bold font, denoting the merge.

Figure 9:
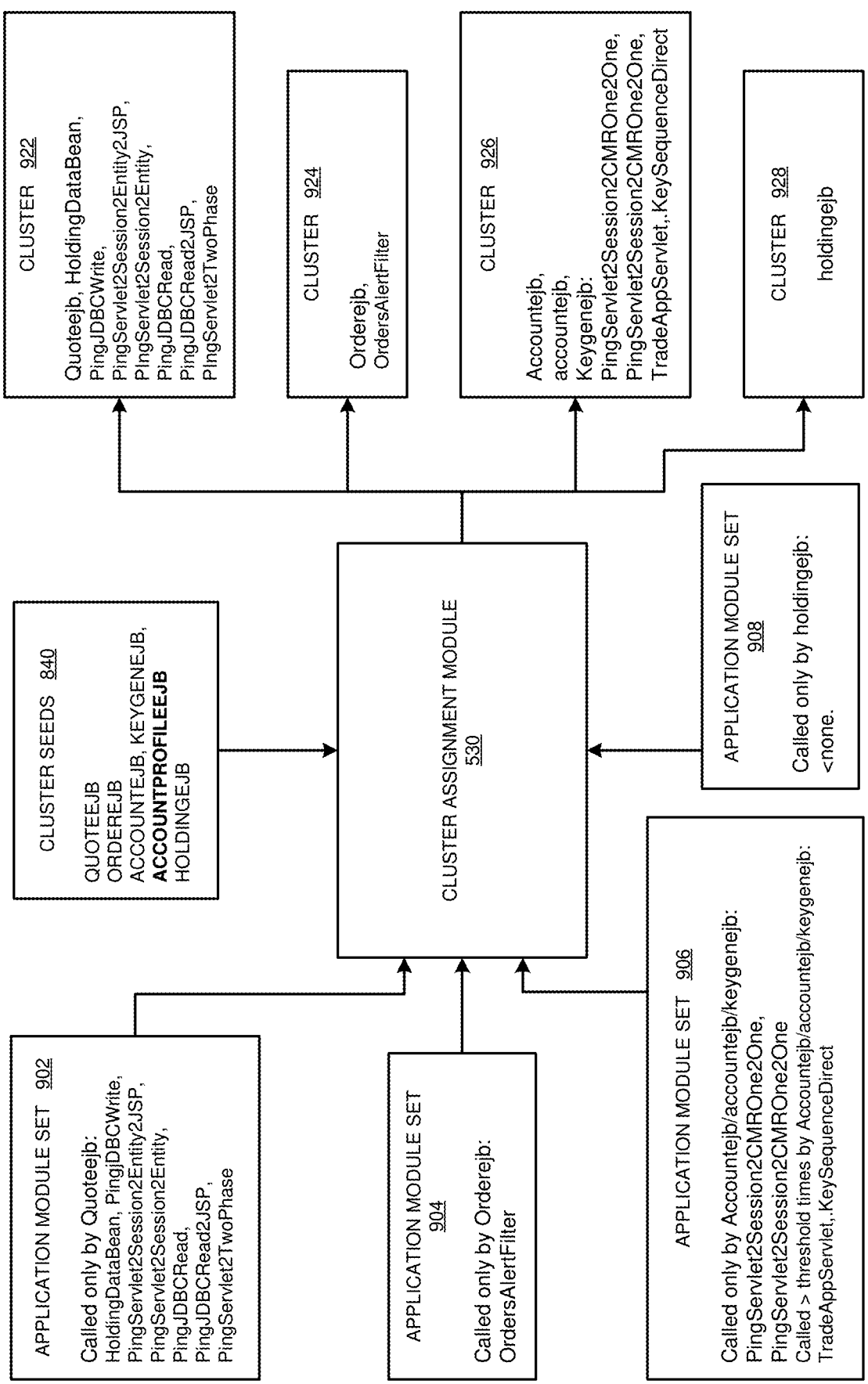
FIG. 9 depicts a continued example of application refactoring with explainability in accordance with an illustrative embodiment.

With reference to FIG. 9, this figure depicts a continued example of application refactoring with explainability in accordance with an illustrative embodiment. Cluster assignment module 530 is the same as cluster assignment module 530 in FIG. 5. Cluster seeds 840 is the same as cluster seeds 840 in FIG. 8.

Cluster assignment module 530 forms a cluster seed and a subset of the nodes in the application graph into a cluster. Each node in the subset corresponds to an application module (such as a function or method) called only by the resource corresponding to the cluster seed. Thus, application module set 902, including modules called only by the quoteejb resource, is added to cluster 922, the cluster having quoteejb as its cluster seed. Application module set 904, including modules called only by the orderejb resource, is added to cluster 924, the cluster having orderejb as its cluster seed. Application module set 906, including modules called only by the accountejb, accountejb, and keygenejb resources, is added to cluster 926, the cluster having accountejb, accountejb, and keygenejb as its merged cluster seed. Application module set 908, has no modules called only by the holdingejb resource, thus cluster 928 does not include any additional modules.

Figure 10:
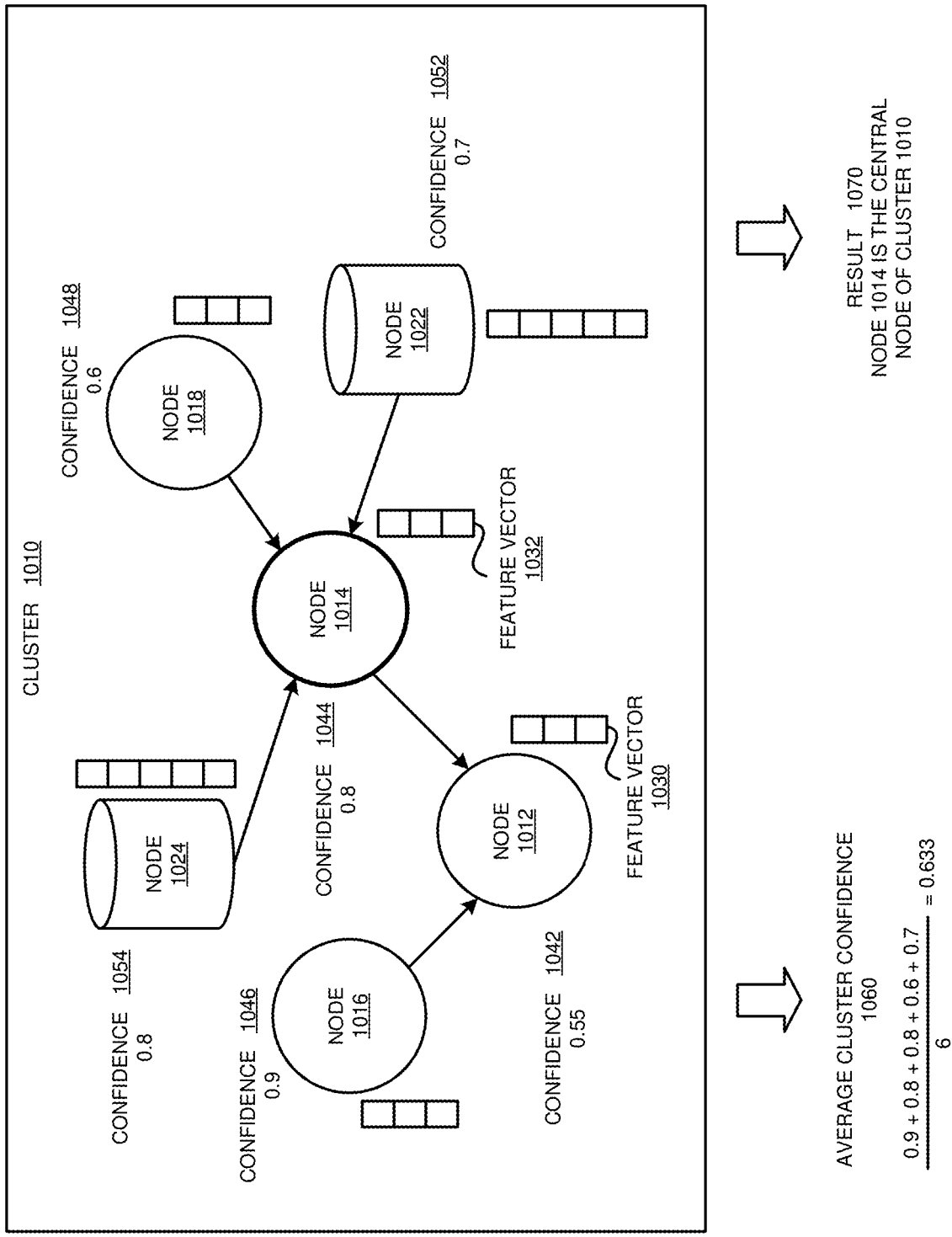
FIG. 10 depicts another example of application refactoring with explainability in accordance with an illustrative embodiment.

With reference to FIG. 10, this figure depicts another example of application refactoring with explainability in accordance with an illustrative embodiment. The example can be executed using application 300 in FIG. 3.

FIG. 10 depicts a portion of a graph representing cluster 1010, formed by clustering module 410 in FIG. 4. Nodes 1012, 1014, 1016, 1018, represented by circles, represent code modules of the application. Nodes 1022 and 1024, represented by cylinders, represent resources of the application. Edges connect the nodes. Each node has a corresponding feature vector. For example, node 1012 is represented by feature vector 1030, and node 1014 is represented by feature vector 1032. Confidence values 1042, 1044, 1046, 1048, 1052, and 1054 correspond to nodes 1012, 1014, 1016, 1018, 1022, and 1024 respectively. As depicted, application 300 has calculated average cluster confidence value 1060 by averaging confidence values 1042, 1044, 1046, 1048, 1052, and 1054. Application 300 has determined the arithmetic mean of all nodes in the cluster by treating the feature vectors corresponding to each node in the cluster as sets of coordinates, or points, in a multidimensional space, and averaging the feature vectors together. Application 300 determines the node closest to the arithmetic mean by computing a distance, in terms of feature vectors, between the arithmetic mean and each node in the cluster. Thus, application 300 has determined result 1070: node 1014 is the central node of cluster 1010.

Figure 11:
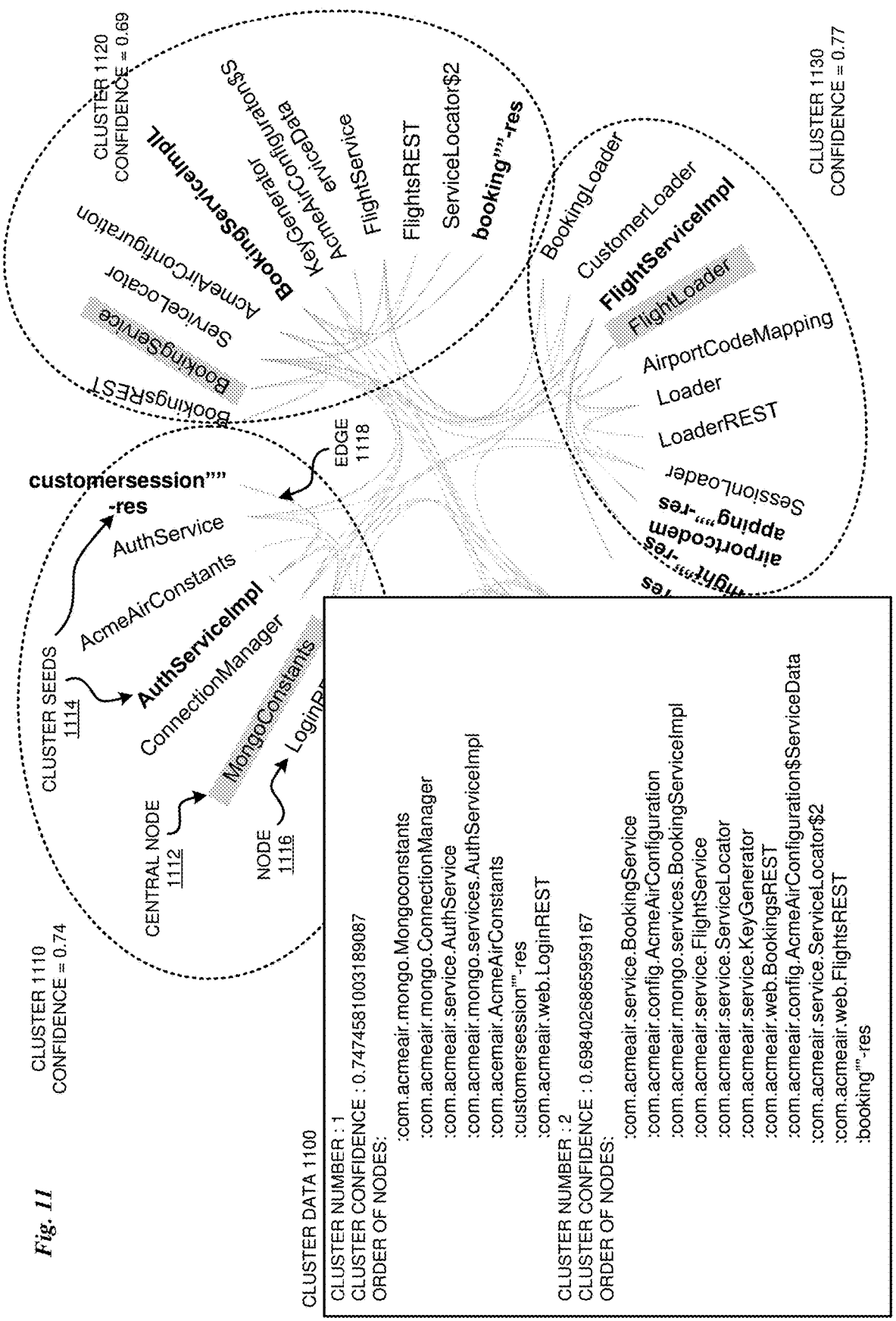
FIG. 11 depicts another example of application refactoring with explainability in accordance with an illustrative embodiment.

With reference to FIG. 11, this figure depicts another example of application refactoring with explainability in accordance with an illustrative embodiment. The example can be executed using application 300 in FIG. 3.

Cluster data 1100 is the result of application 300's analysis of an application graph. Module names around the periphery correspond to nodes, for example cluster seeds 1114, central node 1112, and node 1116 in cluster 1110. Edges, for example edge 1118, connect nodes. Modules in clusters 1120 and 1130 are also depicted.

Figure 12:
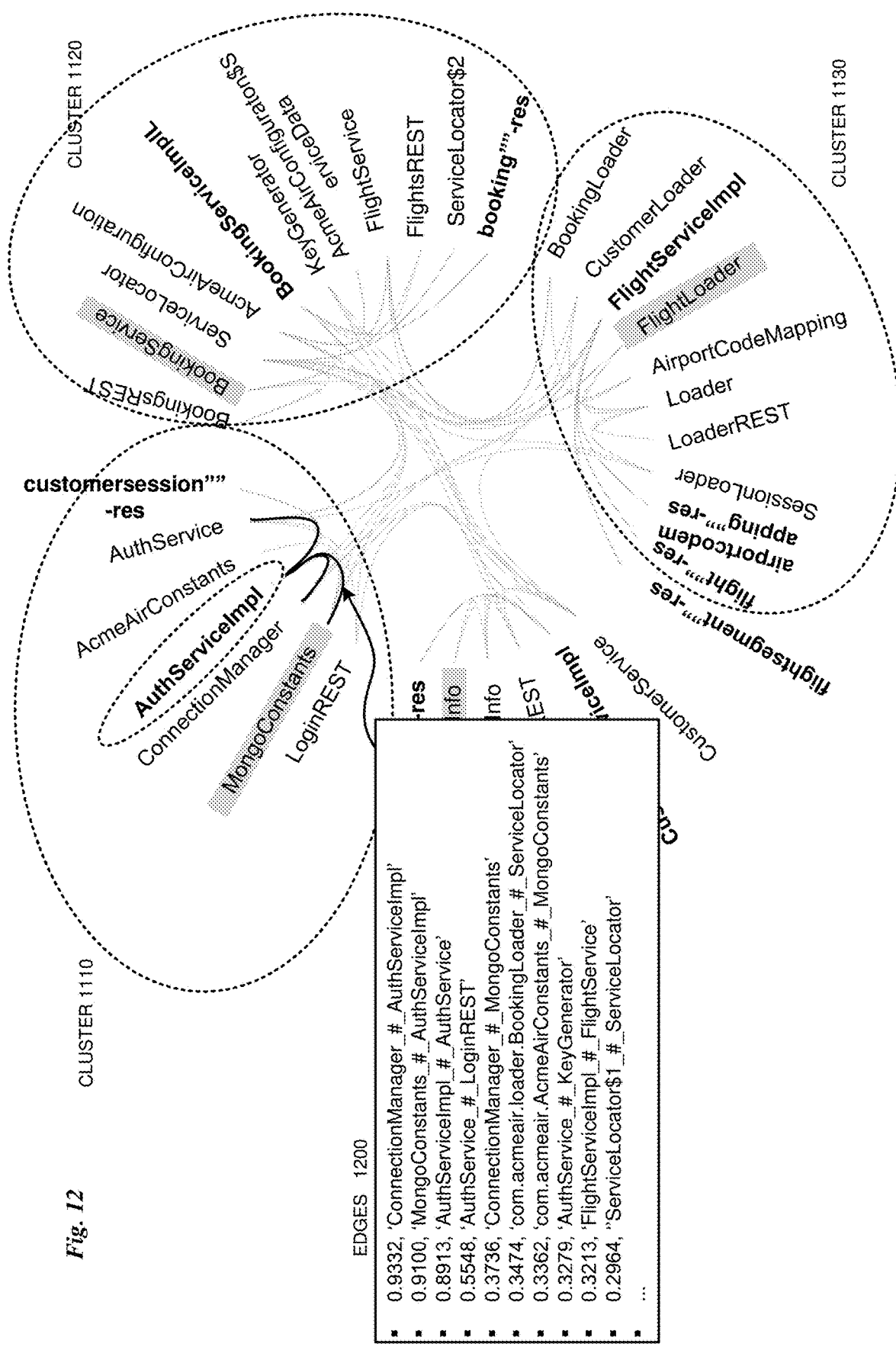
FIG. 12 depicts a continued example of application refactoring with explainability in accordance with an illustrative embodiment.

With reference to FIG. 12, this figure depicts a continued example of application refactoring with explainability in accordance with an illustrative embodiment. Clusters 1110, 1120, and 1130 are the same as clusters 1110, 1120, and 1130 in FIG. 11.

Application 300 has determined edges 1200 in a manner described herein—the edges connecting the AuthServiceImpl module to other modules in cluster 1100.

Figure 13:
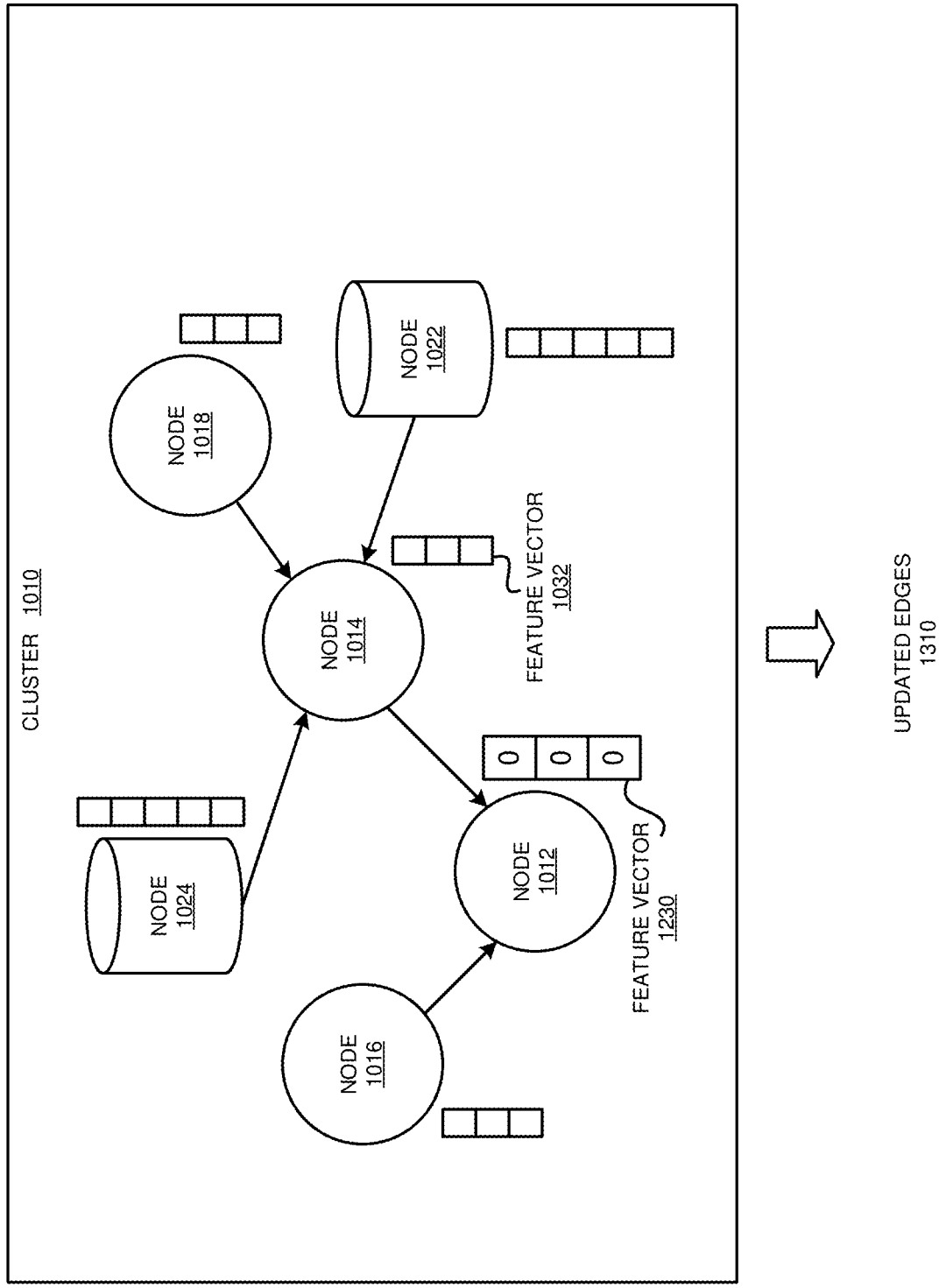
FIG. 13 depicts a continued example of application refactoring with explainability in accordance with an illustrative embodiment.

With reference to FIG. 13, this figure depicts a continued example of application refactoring with explainability in accordance with an illustrative embodiment. Nodes 1012, 1014, 1016, 1018, 1022, and 1024, and feature vector 1032 are the same as nodes 1012, 1014, 1016, 1018, 1022, and 1024, and feature vector 1032 in FIG. 10.

Here, application 300 has set feature vector 1230, the feature vector corresponding to node 1012, to 0, and reclustered the nodes of the application graph. The result is updated edges 1310.

Figure 14:
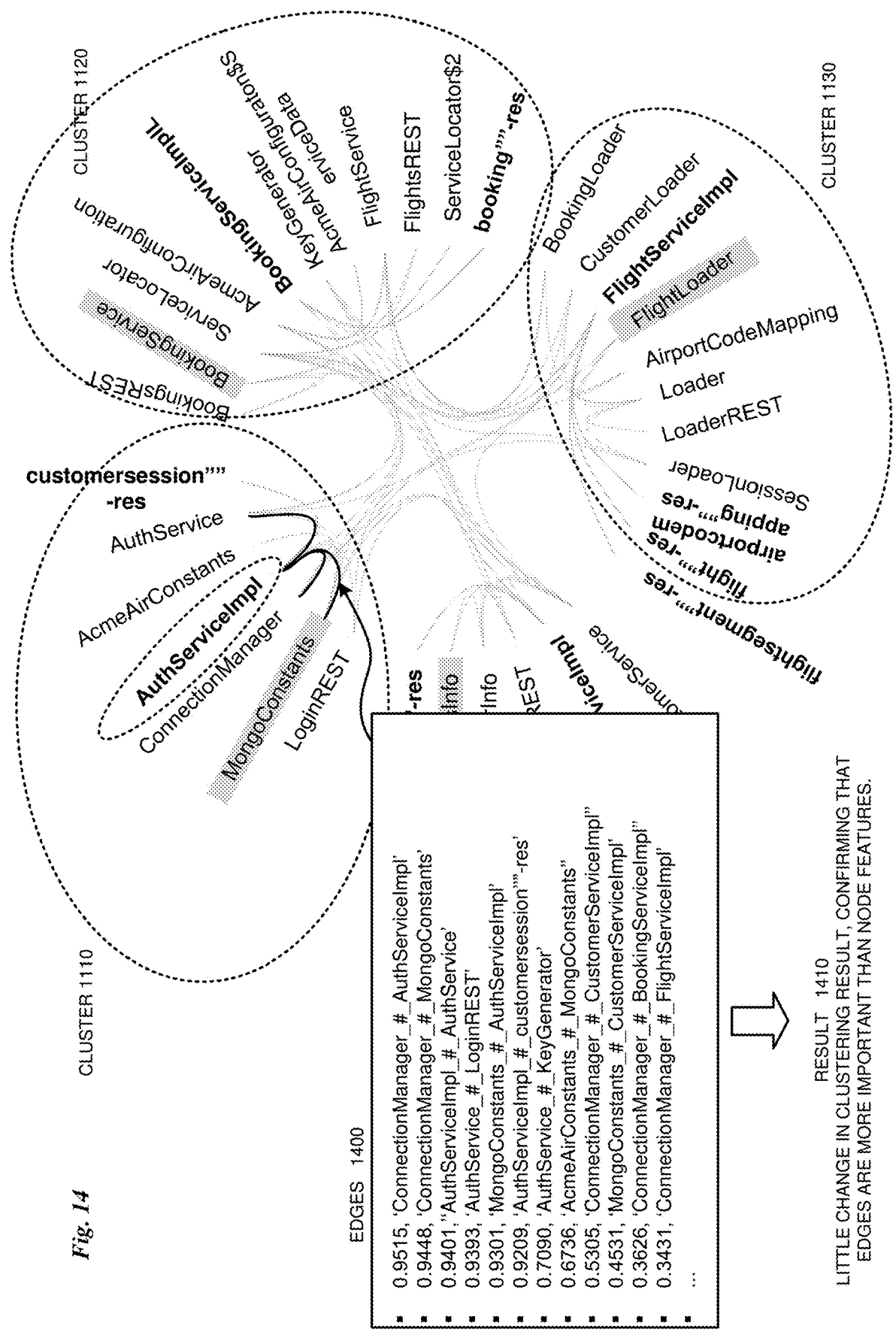
FIG. 14 depicts a continued example of application refactoring with explainability in accordance with an illustrative embodiment.

With reference to FIG. 14, this figure depicts a continued example of application refactoring with explainability in accordance with an illustrative embodiment. Clusters 1110, 1120, and 1130 are the same as clusters 1110, 1120, and 1130 in FIG. 11.

FIG. 14 depicts the result of setting a feature vector corresponding to the AuthServiceImpl module node in cluster 1110 to 0, and reclustering. The reclustering results in edges 1400, leading to result 1410—the edges have not changed significantly from edges 1200 in FIG. 12. Thus, features are relatively unimportant, and edges are relatively important, in placing the AuthServiceImpl module in cluster 1110.

Figure 15:
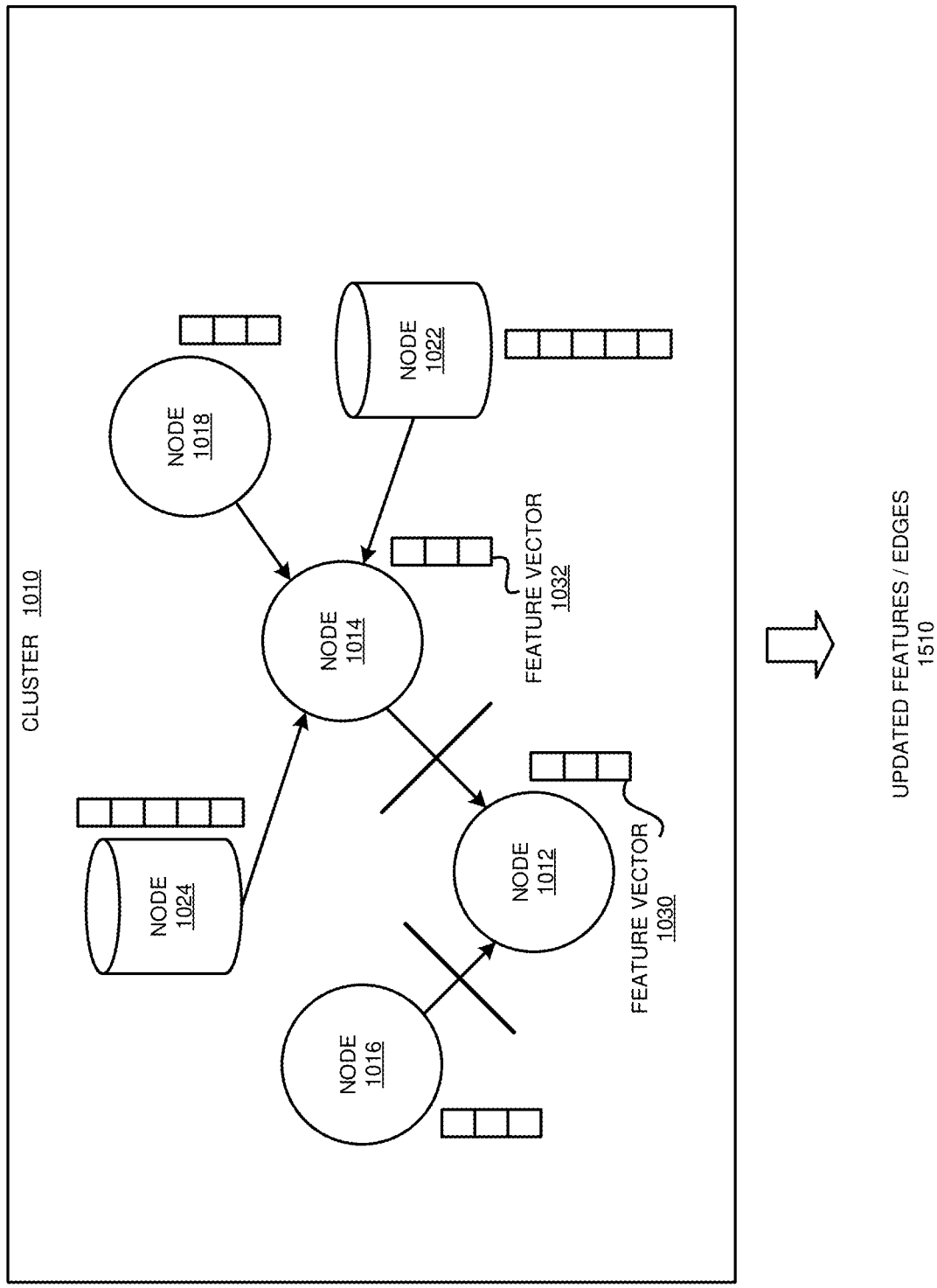
FIG. 15 depicts a continued example of application refactoring with explainability in accordance with an illustrative embodiment.

With reference to FIG. 15, this figure depicts a continued example of application refactoring with explainability in accordance with an illustrative embodiment. Nodes 1012, 1014, 1016, 1018, 1022, and 1024, and feature vectors 1030 and 1032 are the same as nodes 1012, 1014, 1016, 1018, 1022, and 1024, and feature vectors 1030 and 1032 in FIG. 10.

Here, application 300 has removed the edges connecting node 1012 to the rest of the graph, and reclustered the nodes of the application graph. The result is updated features/edges 1510.

Figure 16:
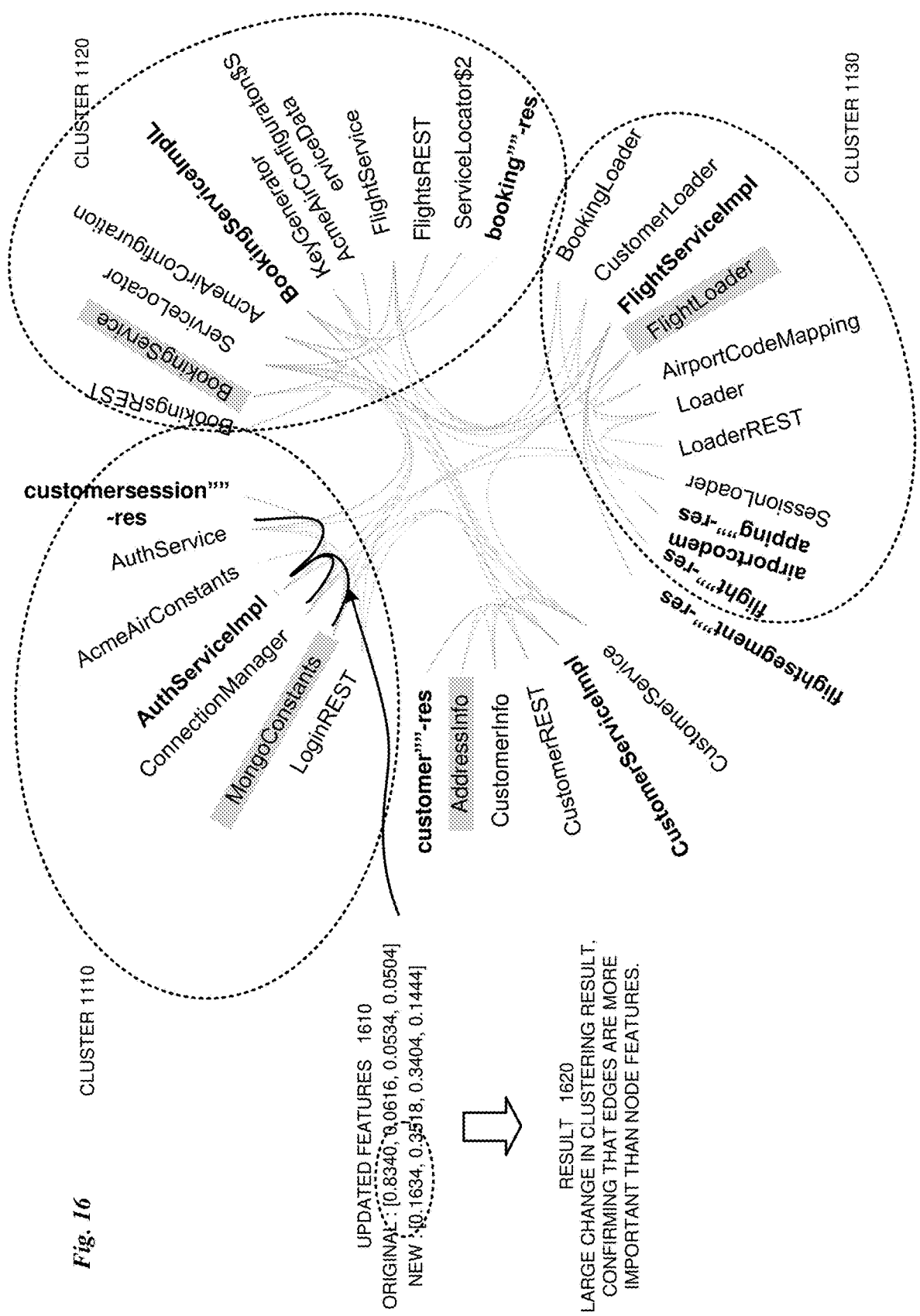
FIG. 16 depicts a continued example of application refactoring with explainability in accordance with an illustrative embodiment.

With reference to FIG. 16, this figure depicts a continued example of application refactoring with explainability in accordance with an illustrative embodiment. Clusters 1110, 1120, and 1130 are the same as clusters 1110, 1120, and 1130 in FIG. 11.

FIG. 16 depicts the result of removing the edges connecting the AuthServiceImpl module node in cluster 1110 to other nodes in the cluster, and reclustering, generating updated feature 1610. Thus result 1620 indicates that relatively large changes in clustering have resulted, confirming that edges are more important than features in placing the AuthServiceImpl module in cluster 1110.

Figure 17:
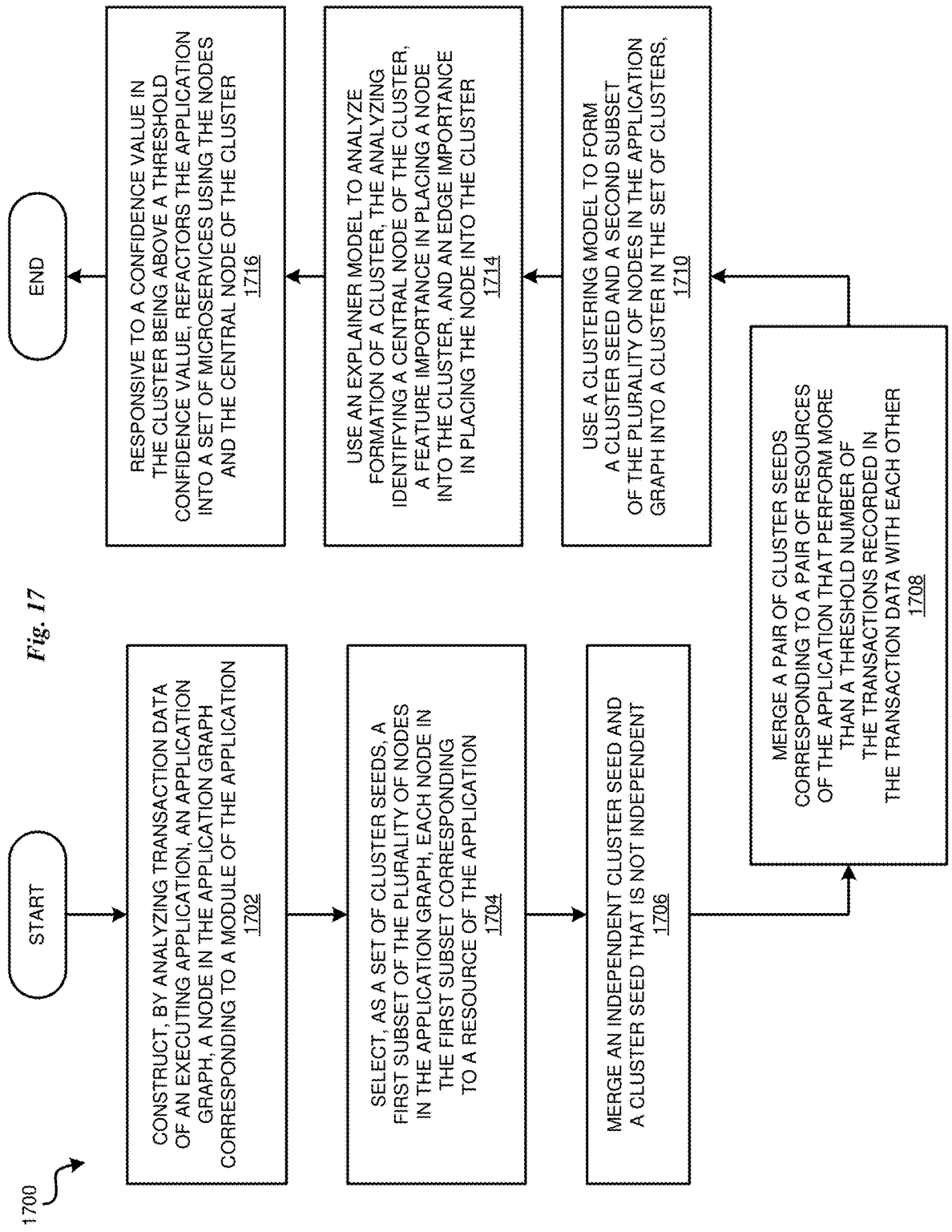
FIG. 17 depicts a flowchart of an example process for application refactoring with explainability in accordance with an illustrative embodiment.

With reference to FIG. 17, this figure depicts a flowchart of an example process for application refactoring with explainability in accordance with an illustrative embodiment. Process 1700 can be implemented in application 300 in FIG. 3.

In block 1702, the application constructs, by analyzing transaction data of an executing application, an application graph, a node in the application graph corresponding to a module of the application. In block 1704, the application selects, as a set of cluster seeds, a first subset of the plurality of nodes in the application graph, each node in the first subset corresponding to a resource of the application. In block 1706, the application merges an independent cluster seed and a cluster seed that is not independent. In block 1708, the application merges a pair of cluster seeds corresponding to a pair of resources of the application that perform more than a threshold number of the transactions recorded in the transaction data with each other. In block 1710, the application uses a clustering model to form a cluster seed and a second subset of the plurality of nodes in the application graph into a cluster in the set of clusters. In block 1714, the application uses an explainer model to analyze formation of a cluster, the analyzing identifying a central node of the cluster, a feature importance in placing a node into the cluster, and an edge importance in placing the node into the cluster. In block 1716, the application, responsive to a confidence value in the cluster being above a threshold confidence value, refactors the application into a set of microservices using the nodes and the central node of the cluster. Then the application ends.

Figure 18:
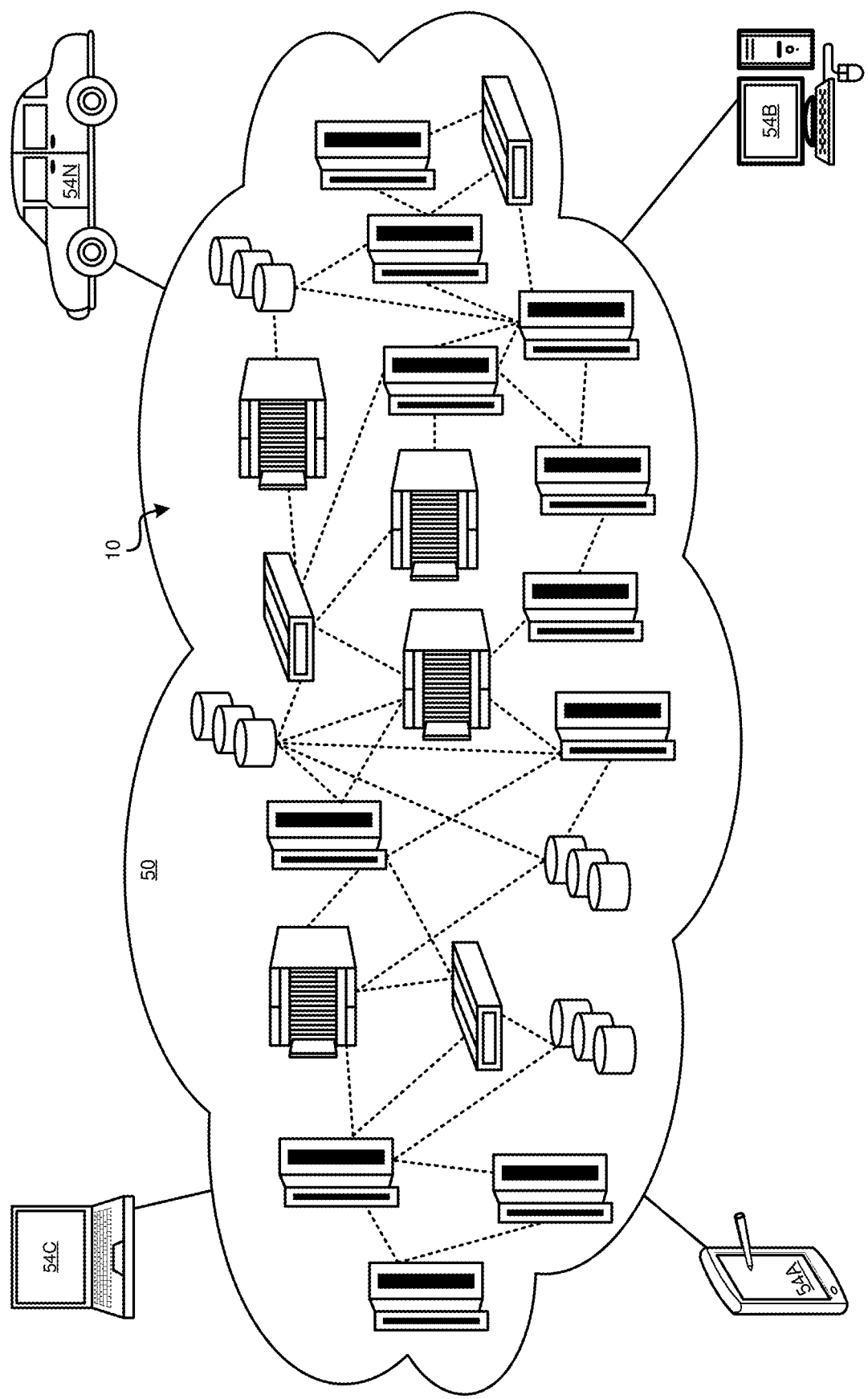
FIG. 18 depicts a cloud computing environment according to an embodiment of the present invention.

Referring now to FIG. 18, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 19:
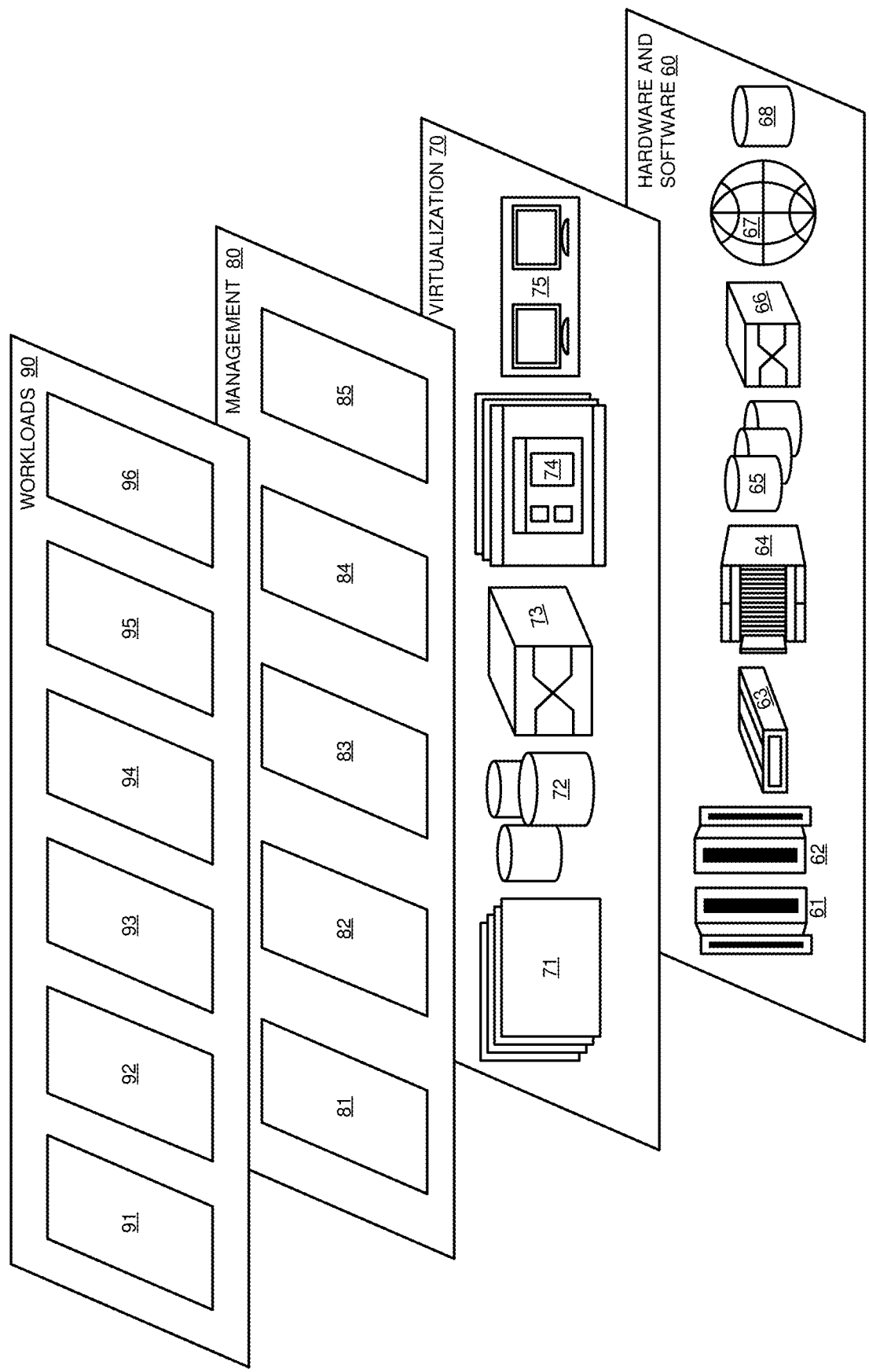
FIG. 19 depicts abstraction model layers according to an embodiment of the present invention.

Referring now to FIG. 19, a set of functional abstraction layers provided by cloud computing environment 50 (FIG. 18) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for application refactoring with explainability and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
constructing, by analyzing transaction data of an executing application, an application graph, the application graph comprising a plurality of nodes and a plurality of edges connecting pairs of the plurality of nodes, a node in the application graph corresponding to a module of the application;
clustering, into a set of clusters, the plurality of nodes;
analyzing formation of a cluster in the set of clusters, the analyzing identifying a central node of the cluster, a feature importance in placing a node into the cluster, and an edge importance in placing the node into the cluster; and
refactoring, responsive to a confidence value in the cluster being above a threshold confidence value, using the central node of the cluster, the application into a set of microservices, the cluster corresponding to a microservice in the set of microservices, the central node of the cluster corresponding to a component of the microservice.

2. The computer-implemented method of claim 1, wherein clustering, into the set of clusters, the plurality of nodes comprises:
selecting, as a set of cluster seeds, a first subset of the plurality of nodes in the application graph, each node in the first subset of the plurality of nodes corresponding to a resource of the application, wherein the resource is a data source of a transaction recorded in the transaction data; and
forming, into a cluster in the set of clusters, using a clustering model, a cluster seed and a second subset of the plurality of nodes in the application graph, each node in the second subset of the plurality of nodes corresponding to an application module.

3. The computer-implemented method of claim 2, further comprising:
merging, into a first merged cluster seed, a first cluster seed in the set of cluster seeds and a second cluster seed in the set of cluster seeds, wherein the first cluster seed is independent and the second cluster seed is not independent, wherein an independent cluster seed corresponds to a first resource of the application that performs at least one transaction without utilizing another resource of the application, the merging replacing the first cluster seed and the second cluster seed with the first merged cluster seed in the set of cluster seeds.

4. The computer-implemented method of claim 2, further comprising:
merging, into a second merged cluster seed, a third cluster seed in the set of cluster seeds and a fourth cluster seed in the set of cluster seeds, wherein the third cluster seed and the fourth cluster seed correspond to a pair of resources of the application that perform more than a predetermined threshold number of the transactions recorded in the transaction data with each other.

5. The computer-implemented method of claim 2, further comprising:
adding, to the cluster, a node corresponding to an application module called more than a predetermined threshold proportion of times by the resource corresponding to the cluster seed.

6. The computer-implemented method of claim 1, further comprising:
calculating, by averaging soft clustering co-efficient values of all nodes in the cluster, a confidence value in the cluster.

7. The computer-implemented method of claim 1, wherein identifying the central node of the cluster further comprises:
selecting, as the central node in the cluster, a node closest to an arithmetic mean of all nodes in the cluster, the arithmetic mean and the node closest to the arithmetic mean determined using a feature vector corresponding to each node in the cluster.

8. The computer-implemented method of claim 1, wherein identifying the feature importance and the edge importance in placing the node into the cluster further comprises:
determining a first difference in cluster placement of the node resulting from setting a feature vector corresponding to the node to zero and reclustering, into a second set of clusters, the plurality of nodes;
determining a second difference in cluster placement of the node resulting from removing all edges connected to the node and reclustering, into a third set of clusters, the plurality of nodes; and
determining, from the first difference and the second difference, the feature importance and the edge importance.

9. The computer-implemented method of claim 1, further comprising:
determining a third difference in cluster placement of the node resulting from altering a weight corresponding to the node to zero and reclustering, into a fourth set of clusters, the plurality of nodes; and
determining, from the third difference, a set of most important features and a set of most important edges in placing the node into the cluster.

10. A computer program product for application refactoring, the computer program product comprising:
one or more computer readable storage media, and program instructions collectively stored on the one or more computer readable storage media, the stored program instructions comprising:
program instructions to construct, by analyzing transaction data of an executing application, an application graph, the application graph comprising a plurality of nodes and a plurality of edges connecting pairs of the plurality of nodes, a node in the application graph corresponding to a module of the application;
program instructions to cluster, into a set of clusters, the plurality of nodes;
program instructions to analyze formation of a cluster in the set of clusters, the analyzing identifying a central node of the cluster, a feature importance in placing a node into the cluster, and an edge importance in placing the node into the cluster; and
program instructions to refactor, responsive to a confidence value in the cluster being above a threshold confidence value, using the central node of the cluster, the application into a set of microservices, the cluster corresponding to a microservice in the set of microservices.

11. The computer program product of claim 10, wherein program instructions to cluster, into the set of clusters, the plurality of nodes comprises:
program instructions to select, as a set of cluster seeds, a first subset of the plurality of nodes in the application graph, each node in the first subset of the plurality of nodes corresponding to a resource of the application, wherein the resource is a data source of a transaction recorded in the transaction data; and program instructions to form, into a cluster in the set of clusters, using a clustering model, a cluster seed and a second subset of the plurality of nodes in the application graph, each node in the second subset of the plurality of nodes corresponding to an application module.

12. The computer program product of claim 11, the stored program instructions further comprising:

program instructions to merge, into a first merged cluster seed, a first cluster seed in the set of cluster seeds and a second cluster seed in the set of cluster seeds, wherein the first cluster seed is independent and the second cluster seed is not independent, wherein an independent cluster seed corresponds to a first resource of the application that performs at least one transaction without utilizing another resource of the application, the merging replacing the first cluster seed and the second cluster seed with the first merged cluster seed in the set of cluster seeds.

13. The computer program product of claim 11, the stored program instructions further comprising:

program instructions to merge, into a second merged cluster seed, a third cluster seed in the set of cluster seeds and a fourth cluster seed in the set of cluster seeds, wherein the third cluster seed and the fourth cluster seed correspond to a pair of resources of the application that perform more than a predetermined threshold number of the transactions recorded in the transaction data with each other.

14. The computer program product of claim 11, the stored program instructions further comprising:

program instructions to add, to the cluster, a node corresponding to an application module called more than a predetermined threshold proportion of times by the resource corresponding to the cluster seed.

15. The computer program product of claim 10, the stored program instructions further comprising:

program instructions to calculate, by averaging soft clustering co-efficient values of all nodes in the cluster, a confidence value in the cluster.

16. The computer program product of claim 10, wherein program instructions to identify the central node of the cluster further comprises:

program instructions to select, as the central node in the cluster, a node closest to an arithmetic mean of all nodes in the cluster, the arithmetic mean and the node closest to the arithmetic mean determined using a feature vector corresponding to each node in the cluster.

17. The computer program product of claim 10, wherein the stored program instructions are stored in the at least one of the one or more storage media of a local data processing system, and wherein the stored program instructions are transferred over a network from a remote data processing system.

18. The computer program product of claim 10, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 10, wherein the computer program product is provided as a service in a cloud environment.

20. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to construct, by analyzing transaction data of an executing application, an application graph, the application graph comprising a plurality of nodes and a plurality of edges connecting pairs of the plurality of nodes, a node in the application graph corresponding to a module of the application;

program instructions to cluster, into a set of clusters, the plurality of nodes;

program instructions to analyze formation of a cluster in the set of clusters, the analyzing identifying a central node of the cluster, a feature importance in placing a node into the cluster, and an edge importance in placing the node into the cluster; and program instructions to refactor, responsive to a confidence value in the cluster being above a threshold confidence value, using the central node of the cluster, the application into a set of microservices, the cluster corresponding to a microservice in the set of microservices.

* * * * *